(12) United States Patent
Ito

(10) Patent No.: US 9,569,703 B2
(45) Date of Patent: Feb. 14, 2017

(54) DATA TRANSFER APPARATUS AND METHOD THEREOF

(71) Applicant: CANON KABUSHIKI KAISHA, Tokyo (JP)

(72) Inventor: Tadayuki Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/715,991

(22) Filed: May 19, 2015

(65) Prior Publication Data
US 2015/0339546 A1 Nov. 26, 2015

(30) Foreign Application Priority Data
May 23, 2014 (JP) ................................. 2014-107485

(51) Int. Cl.
*G06K 15/02* (2006.01)
*G06F 3/12* (2006.01)
*G06F 12/1081* (2016.01)
*G06T 1/60* (2006.01)

(52) U.S. Cl.
CPC ......... *G06K 15/181* (2013.01); *G06K 15/1817* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 5,444,853 A | * | 8/1995 | Lentz ........................ | G06F 5/06 710/22 |
| 5,905,911 A | * | 5/1999 | Shimizu ................... | G06F 13/28 710/22 |
| 2003/0063773 A1 | * | 4/2003 | Muramatsu ............... | G06T 1/60 382/104 |
| 2004/0184079 A1 | * | 9/2004 | Sakamoto .............. | G06K 15/00 358/1.15 |
| 2005/0141418 A1 | * | 6/2005 | Moon ..................... | H04L 49/90 370/229 |
| 2006/0182353 A1 | * | 8/2006 | Ueno .................... | H04N 19/423 382/232 |
| 2007/0159664 A1 | * | 7/2007 | Tone .................. | H04N 1/32358 358/468 |
| 2007/0269138 A1 | * | 11/2007 | Eguchi ..................... | G06T 1/60 382/305 |
| 2009/0213393 A1 | * | 8/2009 | Morita ................. | G03G 15/043 358/1.9 |

(Continued)

FOREIGN PATENT DOCUMENTS

JP 2006-139606 A 6/2006

*Primary Examiner* — Beniyam Menberu
(74) *Attorney, Agent, or Firm* — Carter, DeLuca, Farrell & Schmidt, LLP

(57) ABSTRACT

A reading process is performed to read data of each area, which is divided from image data, from a buffer storing the image data to be performed on a predetermined image process. A transmitting process is performed to transmit the read data of the area to an image processor. A reception process is performed to receive data generated in the predetermined image process from the image processor. A parameter for a writing process is set based on an area size of the received data. A writing process is performed to write the received data to the buffer by data transfer using direct memory access (DMA).

24 Claims, 16 Drawing Sheets

(56) References Cited

U.S. PATENT DOCUMENTS

| | | | | |
|---|---|---|---|---|
| 2009/0244091 A1* | 10/2009 | Horio | ............... | H04N 7/173 |
| | | | | 345/619 |
| 2010/0309511 A1* | 12/2010 | Ito | ............... | H04N 1/00965 |
| | | | | 358/1.15 |
| 2011/0032997 A1* | 2/2011 | Chua | ............... | H04N 19/61 |
| | | | | 375/240.25 |
| 2012/0140286 A1* | 6/2012 | Ueda | ............... | G06F 1/3228 |
| | | | | 358/1.16 |
| 2013/0070262 A1* | 3/2013 | Konno | ............... | G06F 3/1212 |
| | | | | 358/1.6 |
| 2013/0077868 A1* | 3/2013 | Ito | ............... | G06T 1/60 |
| | | | | 382/195 |
| 2014/0043343 A1* | 2/2014 | Iwai | ............... | G06T 1/60 |
| | | | | 345/502 |

\* cited by examiner

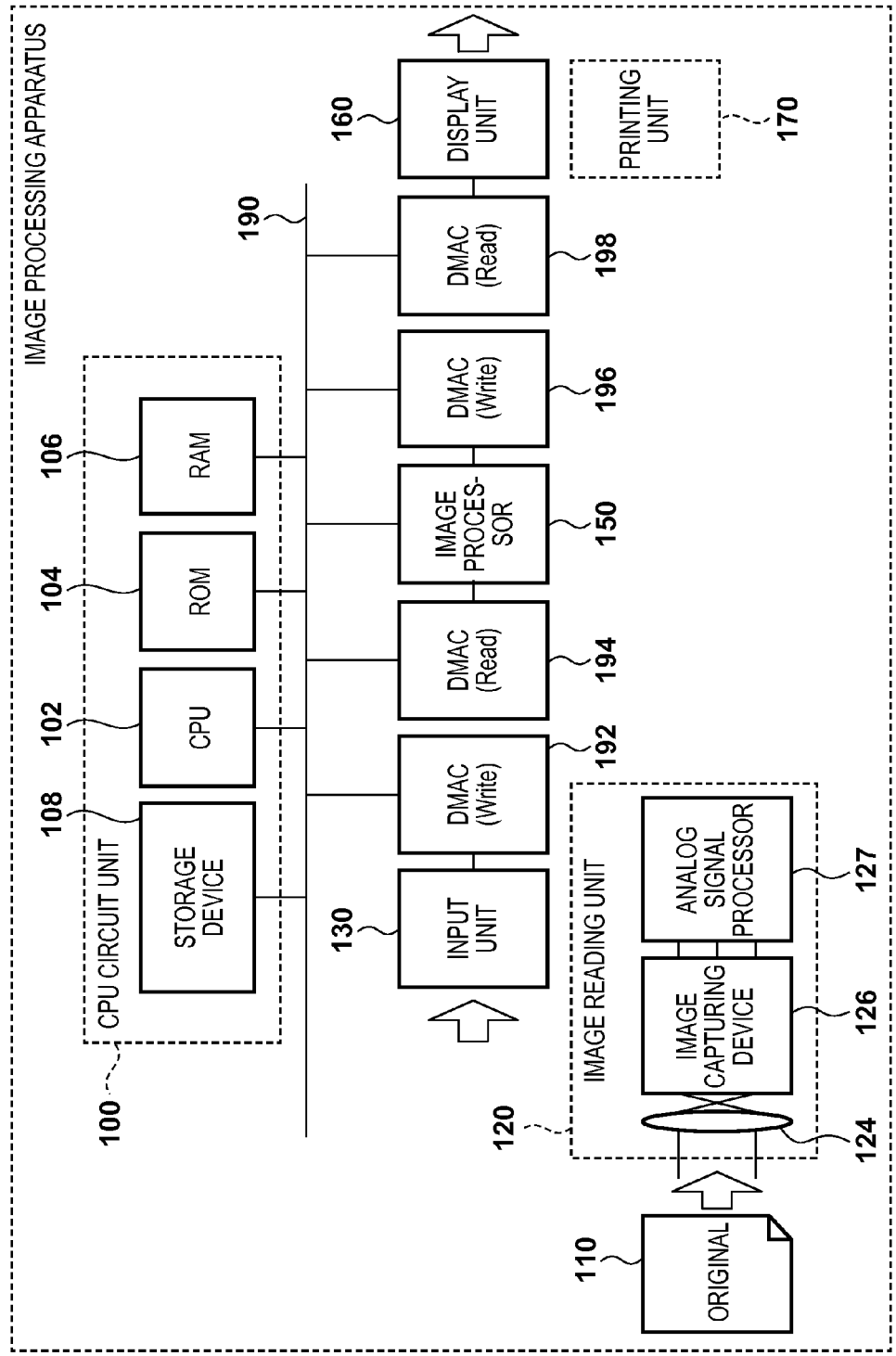

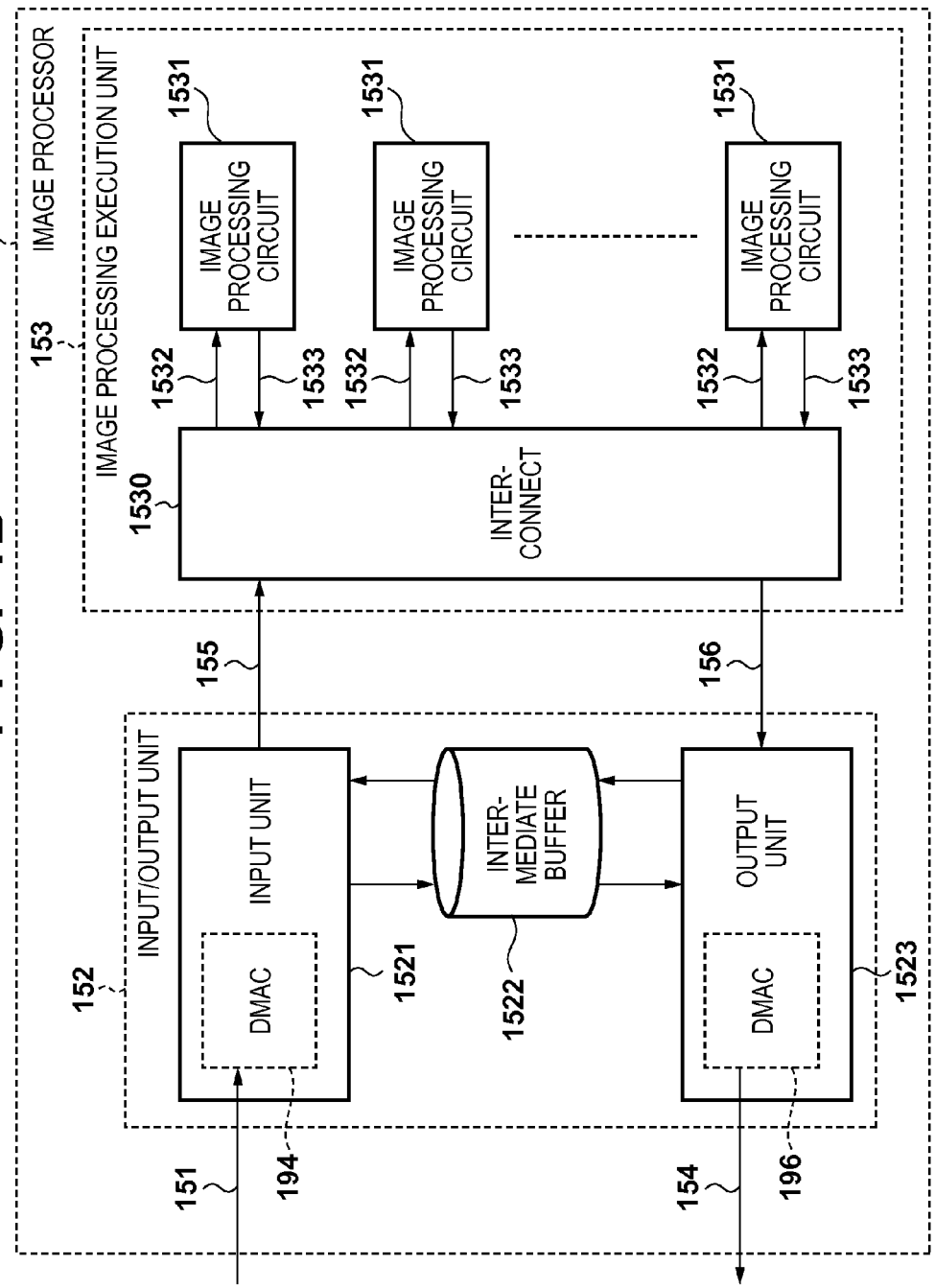

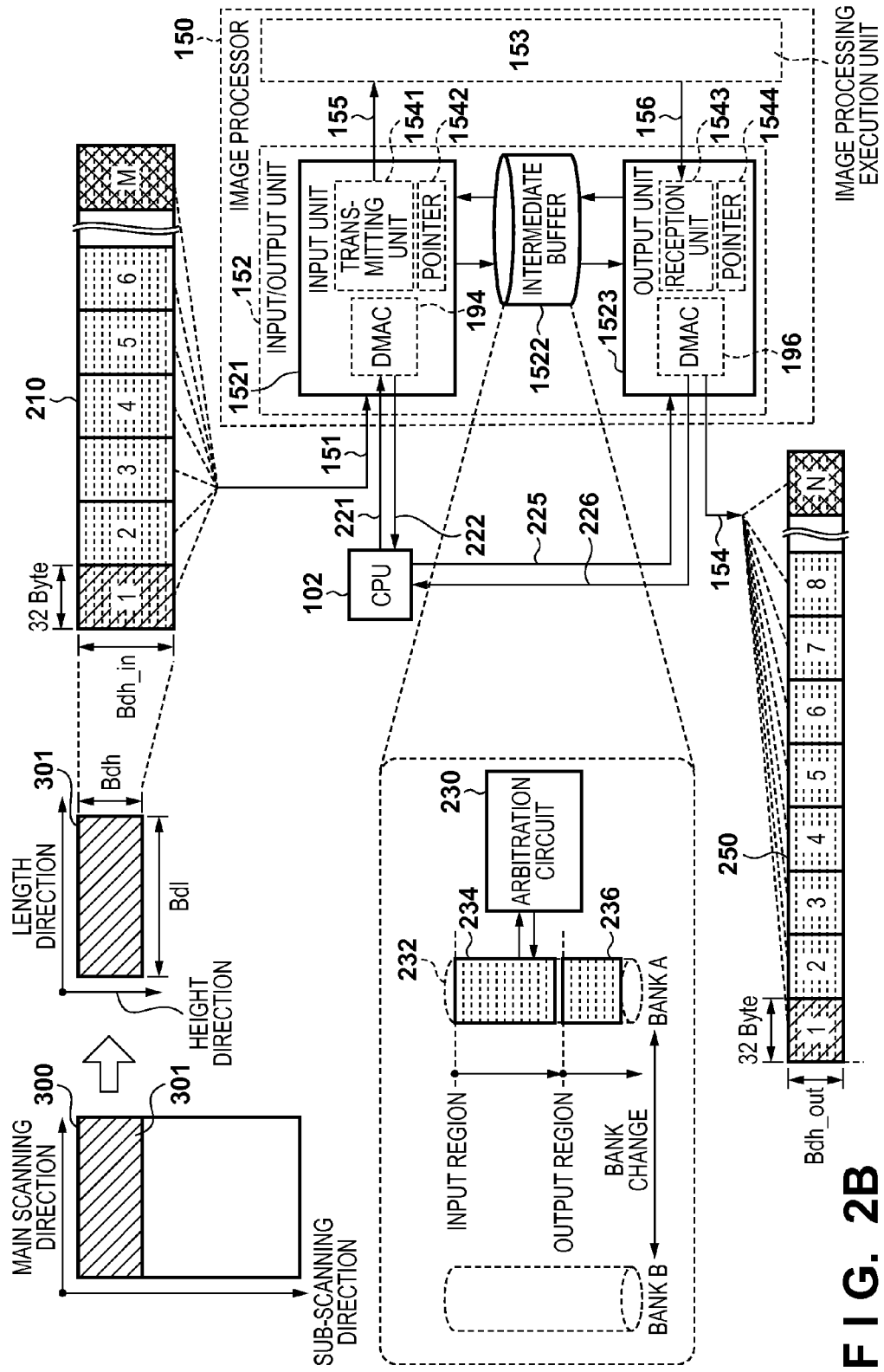
F I G. 2B

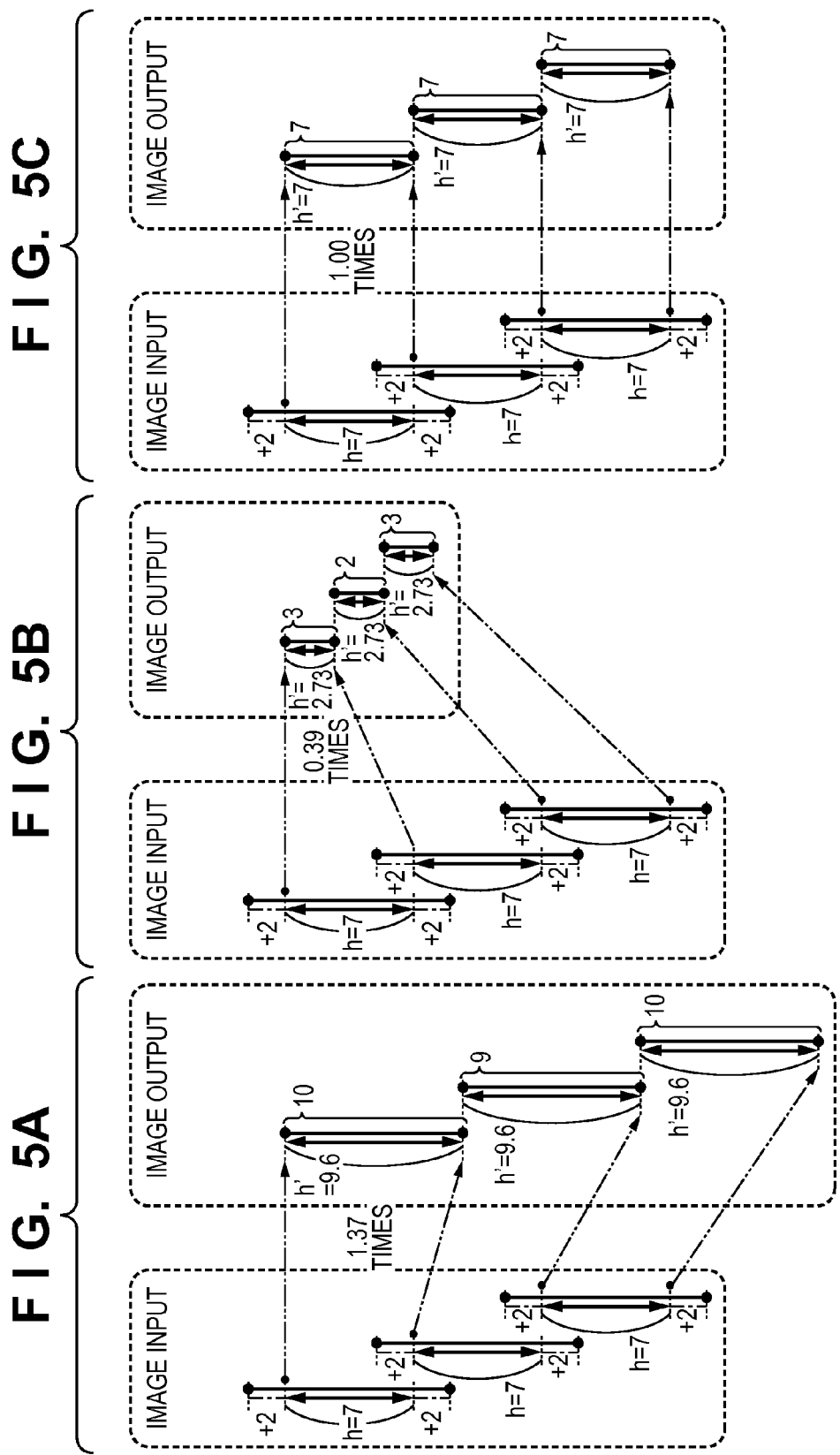

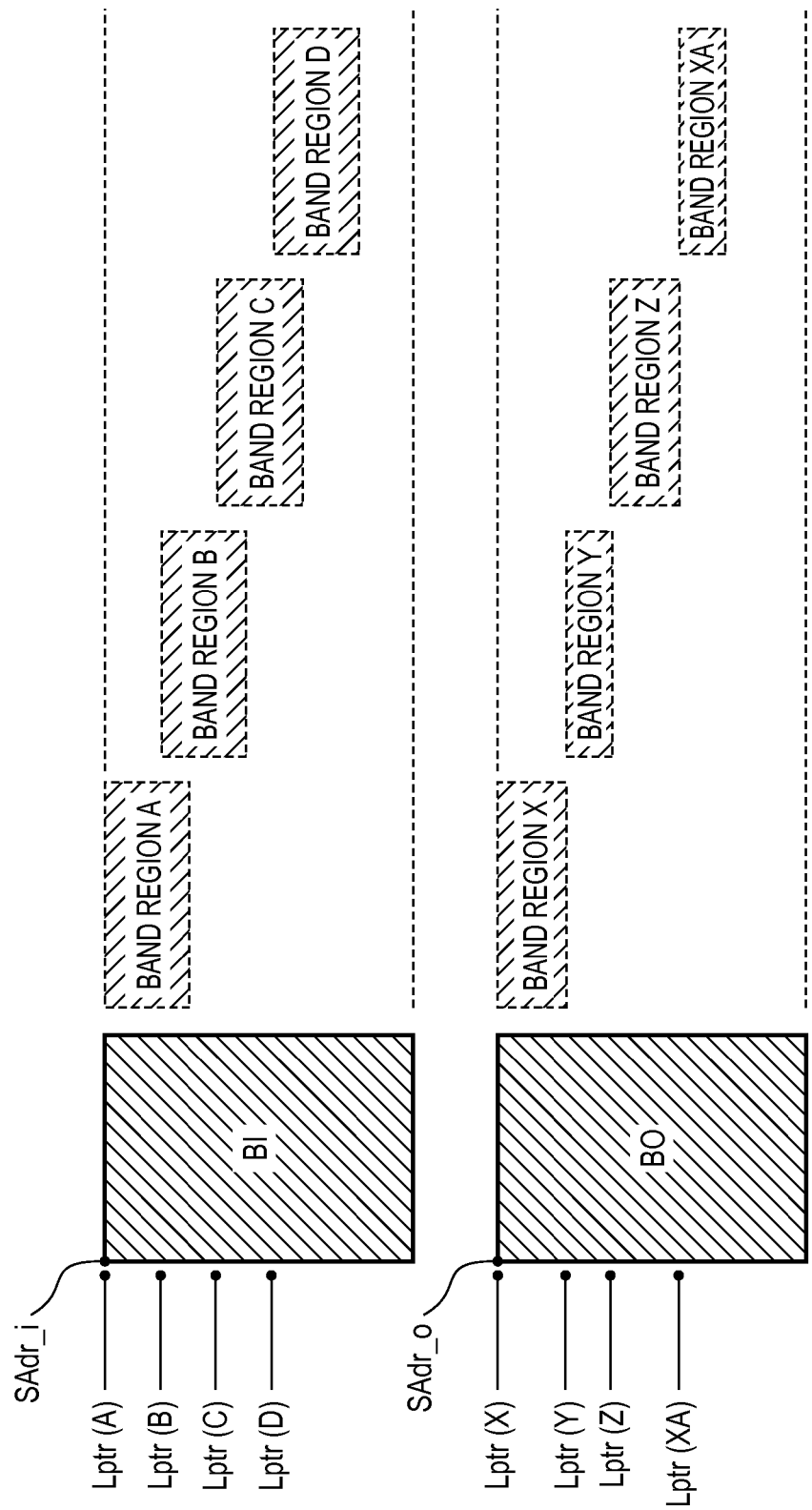

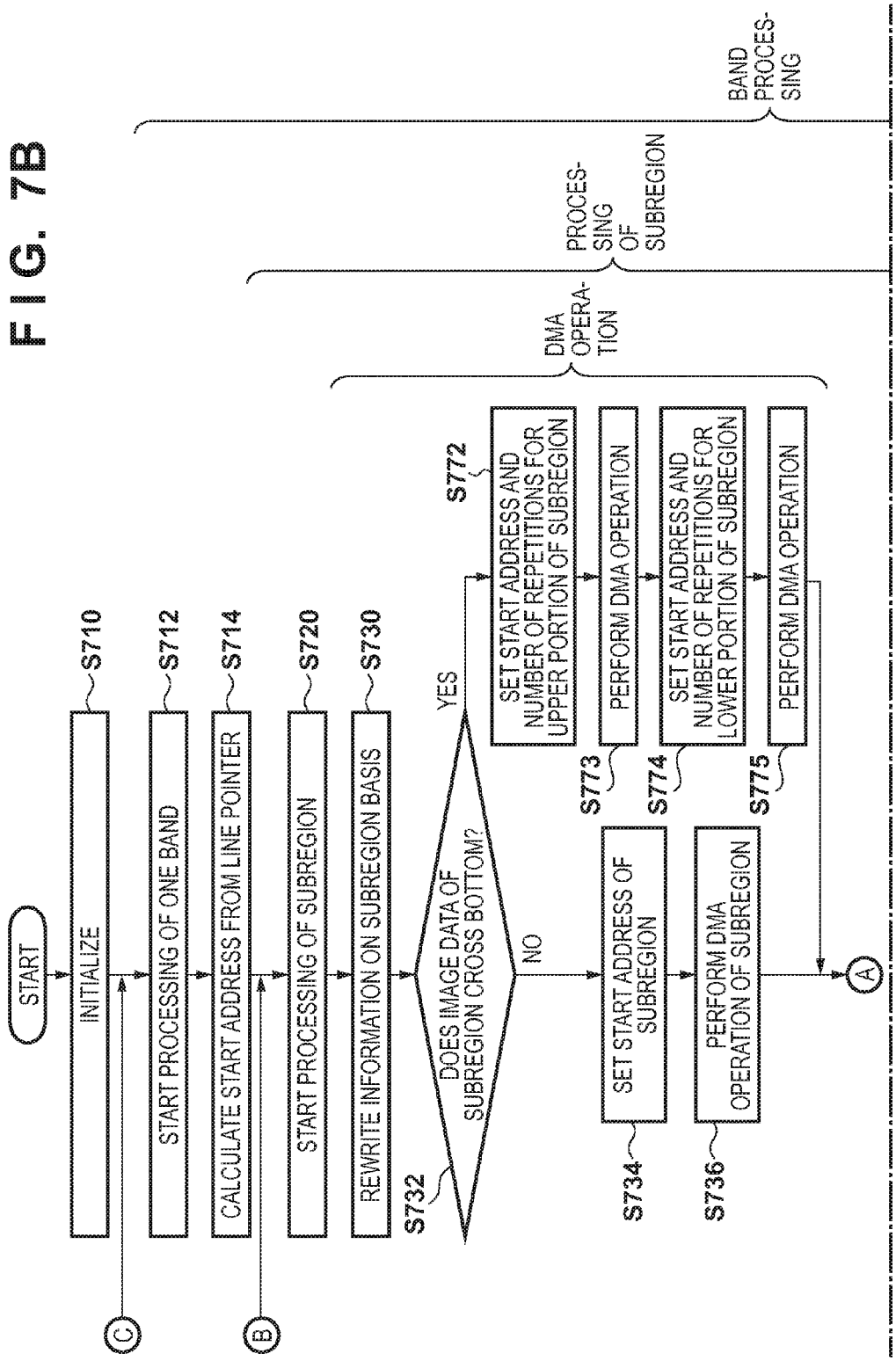

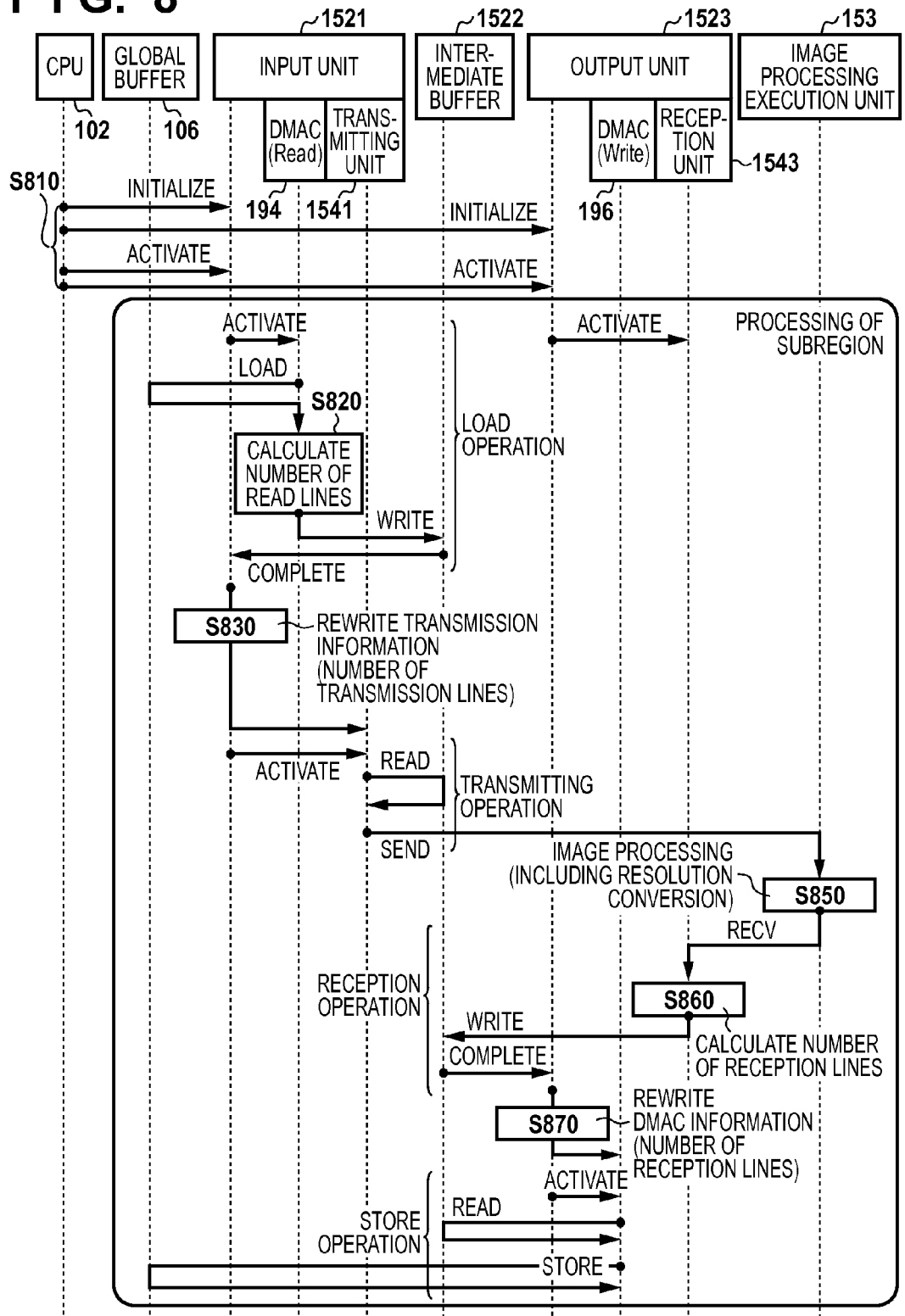

DATA TRANSFER APPARATUS AND METHOD THEREOF

BACKGROUND OF THE INVENTION

Field of the Invention

The present invention relates to data transfer processing between an image processor and a buffer that stores image data to be processed.

Description of the Related Art

When outputting an image by image formation processing, local image processing such as spatial filter processing is performed. In the local image processing, a predetermined operation is performed using all or most pixels in a spatial filter region including pixels to be processed.

Japanese Patent Laid-Open No. 2006-139606 (literature 1) describes a technique of performing local image processing as parallel distributed processing. According to the technique of literature 1, an image is divided into a plurality of regions in the sub-scanning direction (to be referred to as "one dimensional division" hereinafter), and image processing using sequential processing or parallel distributed processing is performed for the divided regions. The method of processing each region obtained by one dimensional division of an image will be referred to as "band processing".

In the band processing, to perform local image processing closely between band regions, a contrivance is made such that images partially overlap at the boundary between a band region and an adjacent band region. In literature 1, when performing local image processing for a band region, the pixels are scanned one by one in the height direction (sub-scanning direction) of the band region. The memory amount of a delay memory for holding the values of pixels necessary for the local image processing is thus defined to the height of the band region, thereby implementing saving of the capacity of the delay memory.

Region division processing for dividing an image into partial images and performing sequential processing or parallel distributed processing has various advantages such as speedup by parallel distributed processing and capacity saving of the delay memory.

One of local image processes is resolution conversion processing of converting an input image into an image of a desired size by enlargement or reduction. According to the resolution conversion processing, since the number of input pixels and the number of output pixels after the processing largely differ from each other, hardware implementation is difficult as compared to other local image processes that do not change the number of pixels between input and output of image data. Hardware implementation becomes more difficult when the resolution conversion processing is combined with the region division processing.

For example, assume that image data on a page space or the like is divided into regions (for example, bands), and resolution conversion (arbitrary magnification) is performed for each of the divided image regions. If the magnification ratio of the resolution conversion is an integer, the size of the image region after conversion is an integer multiple. It is therefore unnecessary to consider a pixel having a size represented by a fraction, that is, smaller than the one-pixel size.

On the other hand, if the magnification ratio is not an integer, a pixel having a size represented by a fraction may be generated in the image region after resolution conversion depending on the size of the input image region. When writing data of the processed image region in a storage device, it is impossible to write the pixel smaller than the one-pixel size. For this reason, it is necessary to perform "rounding" processing to represent the number of pixels by an integer by a method of, for example, writing the pixel smaller than the one-pixel size as one pixel, or neglecting it and prohibiting write, as a matter of course.

When rounding a pixel smaller than the one-pixel size, which is generated by image processing, the set value of a DMA (Direct Memory Access) used to transfer image data may change between the divided regions, and it may be impossible to continuously use the same set value. For example, a set value such as a "start address" or "number of repetitions" needed for transfer using the DMA needs to be calculated and set for each divided region in consideration of the contents of a series of image processes. In this case, the set value of the DMA according to the contents of the series of image processes is calculated for each divided region by firmware that operates on a microprocessor (CPU), and the set value calculated for each divided region is set in a DMA controller (DMAC), and the image processor is sequentially caused to operate.

An image processing apparatus is formed from many units such as a CPU that controls the entire apparatus, a storage device serving as a global buffer for storing image data to be processed, a DMAC that transfers image data on a process unit basis, and an image processor that executes image processing. These units simultaneously and/or cooperatively operate, thereby implementing desired image processing at a desired speed.

In the image processing apparatus, when inputting image data to be processed, partial image data to processed is sequentially read out from the global buffer and temporarily stored in the input local buffer of the image processor, and image processing is executed. When outputting processed image data, partial image data after image processing is temporarily stored in the output local buffer of the image processor and sequentially written in the global buffer. The image processing apparatus thus transfers image data with respect to the global buffer through the input/output local buffer, thereby implementing the simultaneous operation of the units of the image processing apparatus and the cooperative operation between the units.

When calculating the set value of the DMA for each divided region, processing of the CPU is needed for each divided region. Hence, the image processor cannot continuously process the plurality of divided regions.

In addition, when controlling data transfer to the global buffer through the local buffer to control the operations of the plurality of units, if the number of pixels of the input/output image data changes between the divided regions as in the resolution conversion processing, the data transfer cannot uniformly be defined. For this reason, for example, the number of pixels of output data is obtained for each divided region, the setting of the DMA is changed for each divided region, and the image processor is activated. When image processing of one band is completed, the image processor needs to notify the CPU of the completion of processing using an interrupt or the like and synchronize with the CPU. The CPU needs a time of, for example, several ms to receive the interrupt, check the interrupt factor, and transit to the next operation. As a result, a processing load to some degree is always applied to the CPU for synchronization with the processing of the image processor, and the CPU is not released during the image processing. Hence, a delay is needed for the simultaneous operation of the units of the image processing apparatus, and the cooperative operation between the units cannot continuously be executed.

SUMMARY OF THE INVENTION

In one aspect, a data transfer apparatus for transferring data to an image processor configured to perform a predetermined image process on received data, using a buffer assigned to a storage device, the apparatus comprising: an input unit configured to perform a reading process to read data of each area, which is divided from image data, from the buffer storing the image data to be performed on the predetermined image process, and to perform a transmitting process to transmit the read data of the area to the image processor; and an output unit configured to perform a reception process to receive data generated in the predetermined image process from the image processor, to set a parameter for a writing process based on an area size of the received data, and to perform the writing process to write the received data to the buffer, wherein the output unit comprises a first transfer unit configured to perform data transfer using direct memory access (DMA) between the output unit and the buffer.

According to the aspect, it is possible to efficiently control overall image processing and speed up the image processing.

Further features of the present invention will become apparent from the following description of exemplary embodiments with reference to the attached drawings.

BRIEF DESCRIPTION OF THE DRAWINGS

FIG. 1A is a block diagram showing the arrangement of an image processing apparatus.

FIG. 1B is a block diagram showing the arrangement of an image processor.

FIG. 2B is a view for explaining image data input/output processing by a 2-band structure.

FIGS. 5A to 5C are views for explaining a change in the band height before and after image processing.

FIGS. 6A and 6B are views for explaining line pointer management.

FIGS. 7A to 7E are flowcharts showing data transfer processing.

FIG. 8 is a sequence chart showing an example of the sequence of overall control of the image processing apparatus.

DESCRIPTION OF THE EMBODIMENTS

Figure 2A:
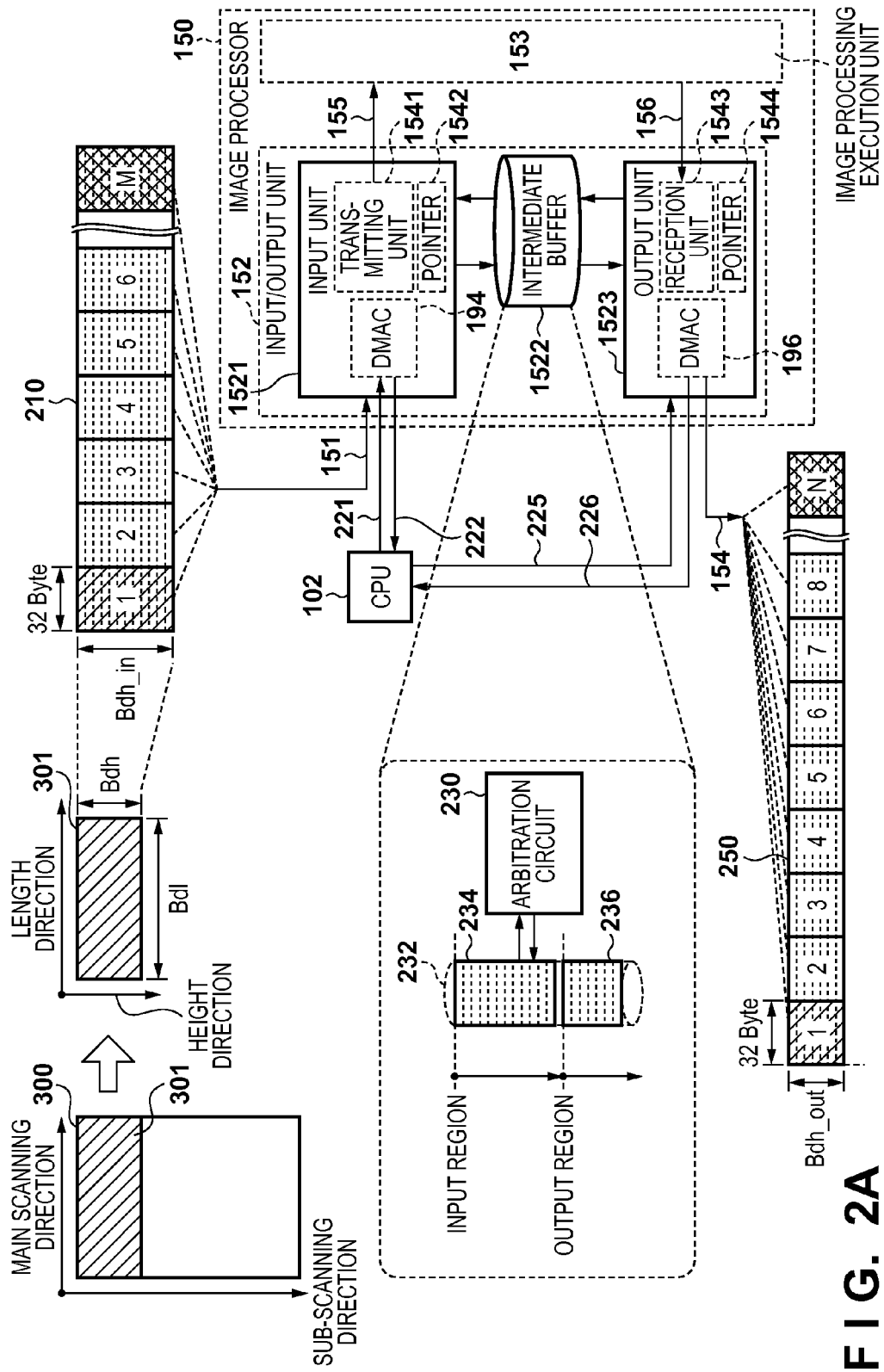
FIG. 2A is a view for explaining image data input/output processing.

A data transfer apparatus and a method thereof in an image processing apparatus according to the embodiments of the present invention will now be described in detail with reference to the accompanying drawings. Note that the components described in the following embodiments are merely examples, and the present invention is not limited by the illustrated components.

First Embodiment

Arrangement of Apparatus

FIG. 1A is a block diagram showing an example of the arrangement of an image processing apparatus according to this embodiment. As shown in FIG. 1A, the image processing apparatus includes a CPU circuit unit 100, an image reading unit 120, an input unit 130, an image processor 150, a display unit 160, and a printing unit 170. The operation of the image processing apparatus by these components will be described below.

The image reading unit 120 includes a lens 124, an image capturing device 126, and an analog signal processor 127. Image information of an original 110 is formed on the image capturing device 126 through the lens 124, and the image capturing device 126 outputs the image information of the original 110 as R (Red), G (Green), and B (Blue) analog signals. The analog signal processor 127 corrects the analog signal of each of R, G, and B colors, analog/digital-converts the corrected analog signals, and outputs a full-color digital image signal. The digital image signal is input to the input unit 130 and then input to a DMAC 192.

The operation of the DMAC 192 is set by a CPU 102 in advance. The DMAC 192 stores the input digital image signal in a random access memory (RAM) 106 or a storage device 108 of the CPU circuit unit 100 through a shared bus 190. Note that a data aggregate that includes the digital image signals of a plurality of pixels to form one image will be referred to as "image data" hereinafter, and the digital image signal is stored in the RAM 106 or the like as image data. When performing image processing, the CPU 102 activates a DMAC 194 to read out the image data stored in the RAM 106 or the like and input digital image signals corresponding to pixels to be processed to the image processor 150.

The image processor 150 performs correction, for example, input gamma correction and correction of the individual difference of the image sensor in the image capturing device 126 of the image reading unit 120 for the input digital image signals. A DMAC 196 stores the image data that has undergone the image processing in the RAM 106 or the storage device 108.

At this time, the CPU 102 sets the operation of the DMAC 196 in advance and activates the DMAC 196. The operation of the DMAC 196 is set to write the image data after the image processing in, for example, the RAM 106. The image processor 150 performs image processing to print image data, for example, input color correction processing, spatial filter processing, color space conversion processing, density correction processing, and halftone processing for the input digital image signals. The printable image data is stored in the RAM 106 or the like by the DMAC 196.

A DMAC 198 reads out the image data processed and stored in the RAM 106 or the like and outputs it to the printing unit 170. The printing unit 170 is, for example, a printer. Setting of the DMAC 198 is done by the CPU 102. The printing unit 170 includes a print output unit (not shown) including an inkjet head or thermal head and prints an image on a print medium based on the digital image signals of the input image data.

Note that an example has been described above in which the image data of the original 110 read by the image reading unit 120 is printed by the printing unit 170. However, the present invention is not limited to this example. For example, desired image (video) processing may be applied to a video input to the input unit 130, and the processed video may be displayed on the display unit 160 such as a display.

The CPU circuit unit 100 includes the CPU 102 for operation control, a read only memory (ROM) 104 that stores permanent data and programs, the RAM 106 used to temporarily store data and load programs, and the storage device 108. The CPU circuit unit 100 controls the image reading unit 120, the input unit 130, the image processor 150, the display unit 160, and the printing unit 170, and generally controls the processing sequence of the image processing apparatus.

The storage device 108 is a storage medium such as a hard disk that stores parameters, programs, and correction data used by the image processing apparatus. The data and programs stored in the RAM 106 may be loaded from the storage device 108. The storage destination of data transferred with respect to the image processor 150 through the DMACs 194 and 196 is not limited to the RAM 106 and may be the storage device 108. The transfer data storage destination allocated to the RAM 106 or the storage device 108 will be referred to as a "global buffer" hereinafter.

Image Processor

The arrangement of the image processor 150 and the operation thereof will be described next with reference to FIG. 1B. Note that to help understanding, FIG. 1B illustrates that the DMAC 194 that reads out image data from the global buffer is included in an input unit 1521, and the DMAC 196 that writes image data in the global buffer is included in an output unit 1523.

When the CPU 102 activates the DMAC 194, the DMAC 194 reads out image data from the global buffer. The data structure of the image data will be described later. The readout image data is input to an input/output unit 152 of the image processor 150 through an input port 151. Upon receiving the image data, the input unit 1521 of the input/output unit 152 stores it in an intermediate buffer 1522 as input image data. The input unit 1521 reads out a pixel value from the input image data temporarily stored in the intermediate buffer 1522, and inputs the pixel value to an image processing execution unit 153 as an input pixel value 155. Note that the intermediate buffer 1522 will sometimes be referred to as a "local buffer" relative to the above-described global buffer.

The image processing execution unit 153 executes predetermined data processing for the input pixel value 155, and outputs an output pixel value 156 obtained as a result to the input/output unit 152. Note that details of the processing of the image processing execution unit 153 will be described later. Each of the input pixel value 155 and the output pixel value 156 can include at least one pixel value. Alternatively, a plurality of pixel values may be input as the input pixel value 155, and one pixel value may be output as the output pixel value 156.

The output unit 1523 of the input/output unit 152 stores the output pixel value 156 in the intermediate buffer 1522, and generates output image data. The output unit 1523 reads out the output image data temporarily stored in the intermediate buffer 1522, and outputs the output image data to the DMAC 196 through an output port 154. The DMAC 196 is already activated by the CPU 102 and writes the input output image data in the global buffer.

As described above, in the image processor 150, the input/output unit 152 acquires image data through the DMAC 194, and the image processing execution unit 153 executes data processing for the image data. The input/output unit 152 outputs the image data that has undergone the data processing through the DMAC 196. In other words, the image processor 150 has a function of performing data processing for the image data stored in the global buffer and returning the processed image data to the global buffer. In addition, the input/output unit 152 has a function as a data input/output control unit that adjusts data input/output.

Image Processing Execution Unit

The image processing execution unit 153 includes a plurality of image processing circuits 1531 and an interconnect 1530. The interconnect 1530 and each of the plurality of image processing circuits 1531 are connected through an input port 1532 and an output port 1533. Each image processing circuit 1531 corresponds to one image process. The image processes include input color correction processing, color space conversion processing, density correction processing, halftone processing, spatial filter processing, resolution conversion processing, trimming processing, end expansion processing, interlace to progressive (IP) conversion, and chroma up sampling processing. Each image processing circuit 1531 can be implemented by hardware such as a pipeline circuit or by a processor that executes n image processing program. Each image processing circuit 1531 receives the input pixel value 155 through the input port 1532, and after data processing, outputs the output pixel value 156 through the output port 1533.

The interconnect 1530 is implemented as a connecting portion such as a crossbar or a ring bus, and can arbitrarily switch the connection destinations of the input ports 1532 and the output ports 1533. Hence, the CPU 102 can change the execution order of image processes of the plurality of image processing circuits 1531 or bypassing some image processes by designating the connection destinations of the ports. In this way, the image processing execution unit 153 selectively combines various kinds of image processes and implements desired image processing in accordance with an application.

[Band Processing]

Band processing of performing processing for each band region obtained by one dimensional division of image data as an image data division method according to this embodiment will be described below with reference to FIGS. 3A to 3E.

Figure 3A:
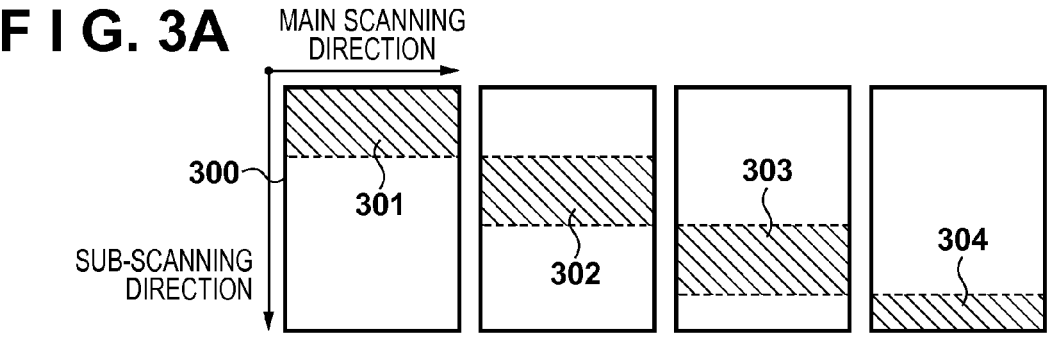
FIGS. 3A to 3E are views for explaining band processing.

In the band processing, one image data 300 is divided into band regions 301 to 304, and image processing is performed sequentially for each band region, as shown in FIG. 3A. Note that the band regions are formed by dividing the image data in one of the main scanning direction and the sub-scanning direction. The band regions and the image data match each other in terms of length in one of the main scanning direction and the sub-scanning direction.

In the example shown in FIG. 3A, the image data is divided in the sub-scanning direction. The main scanning direction length of the image data equals the main scanning direction length of each band region. The sub-scanning direction length of the image data is different from the sub-scanning direction length of each band region. A storage area to store the band regions is called a "band memory", and division of image data is called "band division". The band memory is allocated to an appropriate storage area on the system. For the sake of simplicity, an example in which the band memory is allocated to the RAM 106 that is the global buffer will be described.

Figure 3B:
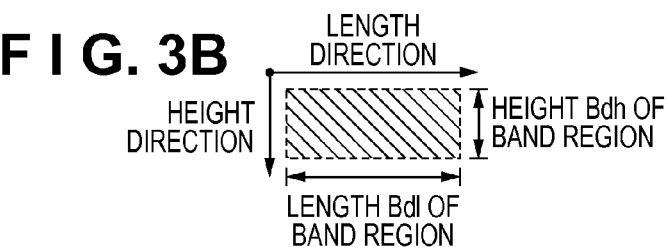

The coordinate system (main scanning direction and sub-scanning direction) of the image data will be defined below by a coordinate system (band region coordinate system) in the length and height directions, and a band region is expressed as length×height, as shown in FIG. 3B. The size of a length direction side of the band region is set to the main scanning direction length or sub-scanning direction length of the image data. The size of a height direction side of the band region is arbitrarily set.

In the example of FIG. 3A, the length direction is the main scanning direction, and the height direction is the sub-scanning direction. If the image data is divided in the main scanning direction, as shown in FIG. 3D, the length direction is the sub-scanning direction, and the height direction is the main scanning direction, as shown in FIG. 3E. Band division as shown in FIG. 3D is effective when, for example, the main scanning direction size of image data is larger than the sub-scanning direction size.

In the band processing shown in FIG. 3A, first, the first band region 301 is stored in the band memory, and image processing is performed. Next, the second band region 302 is overwritten on the band memory that stores the first band region 301, and image processing is performed. After that, the third band region 303 is overwritten on the band memory that stores the second band region 302, and image processing is performed. Finally, the fourth band region 304 is overwritten on the band memory that stores the third band region 303, and image processing is performed.

As can be seen from FIG. 3A, the band regions 301 to 304 have the same length but need not have the same height. Hence, a memory size corresponding to the height of the band memory is decided in accordance with the band regions having the maximum height (band regions 301 to 303 in FIG. 3A).

Figure 3C:
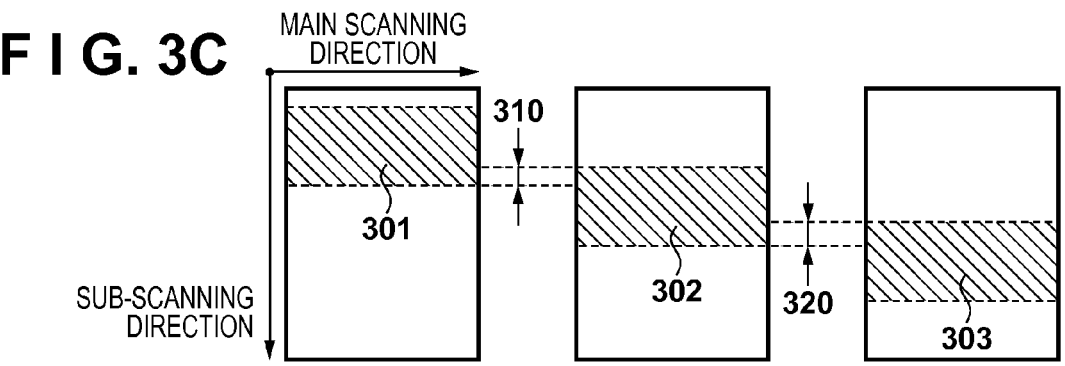
Figure 3D:
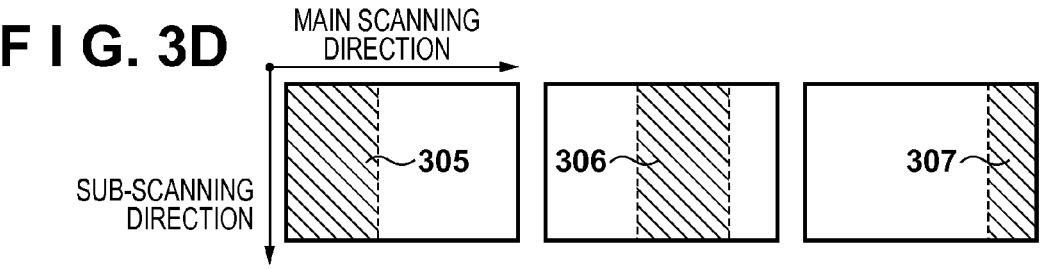
Figure 3E:
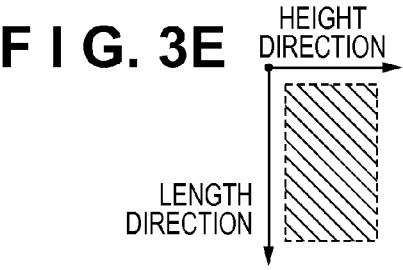

Note that to closely perform local image processing such as spatial filter processing between the band regions, the band regions are set such that a band region and an adjacent band region partially overlap at the boundary between them, as shown in FIG. 3C.

Data Structure of Image Data

As described above, image data is temporarily stored in the global buffer allocated to the RAM 106. In general, the RAM 106 serving as the main memory is often formed from an inexpensive dynamic random access memory (DRAM). Hence, when reading/writing image data through a DMAC, as in this embodiment, the image data is preferably handled in a unit that allows the DRAM to be read- or write-accessed without any deterioration of performance.

Figure 4A:
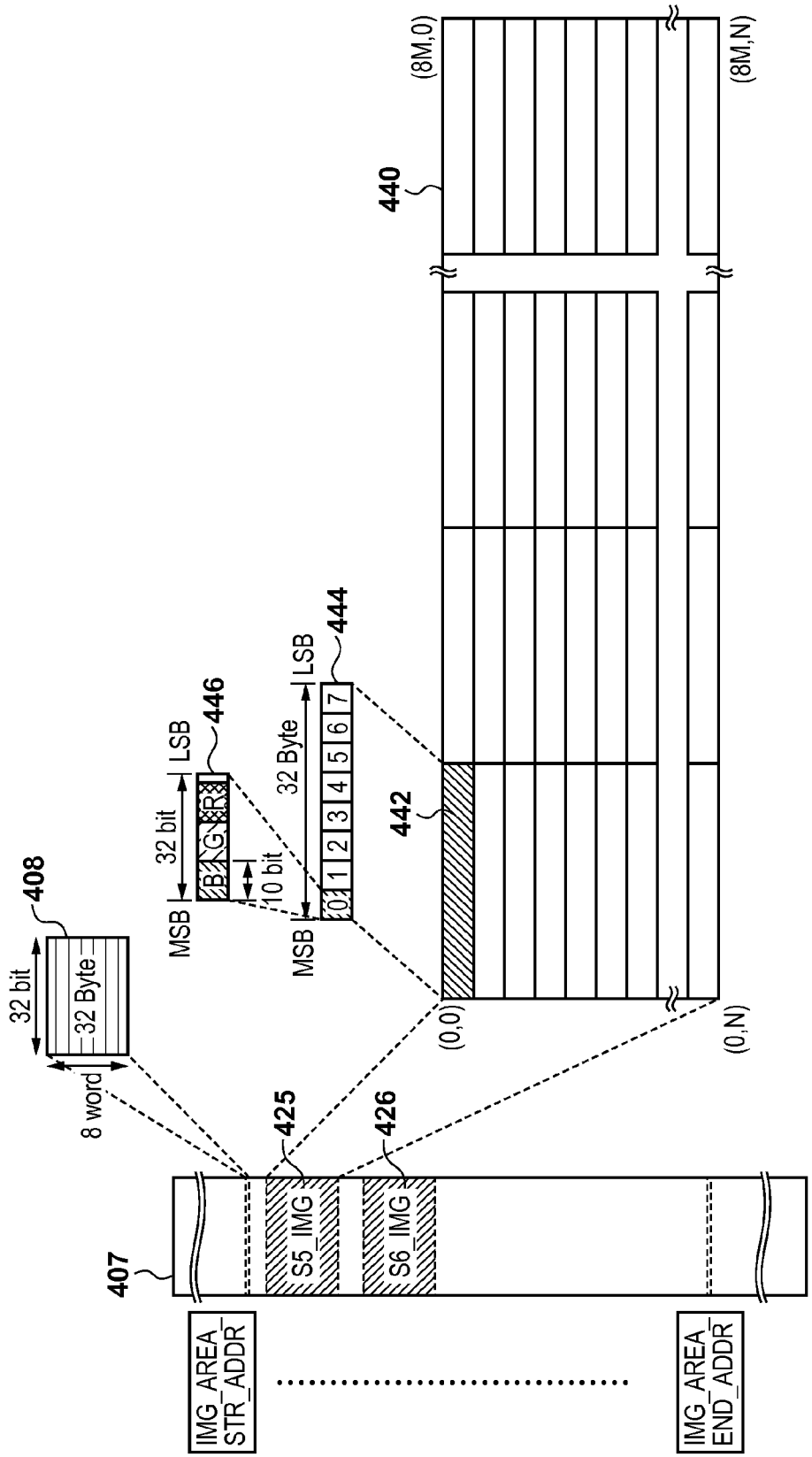
FIGS. 4A and 4B are views for explaining an image data storage method and the data structure of the image data.

FIG. 4A shows an example of image data storage in the RAM 106 formed from a DRAM and an example of the data structure of the image data. FIG. 4A shows a state in which image data necessary for image processing is stored in data areas IMG_AREA_STR_ADDR to IMG_AREA_END_ADDR allocated to the RAM 106. That is, dot-sequential image data 425 and 426 are stored in the data areas. In this example, to read/write image data without deteriorating the performance of the DRAM, the minimum unit of image data to be stored is set to 32 bits×8 words=32 bytes, as indicated by 408. In other words, the data amount of the image data 425 and 426 is an integer multiple of 32 bytes.

Image data 440 includes the image data 425 and the like stored in the DRAM, and dot-sequentially has the pixel values of R, G, and B color components. Each region 442 of the image data 440 stores 32-bytes data, and a plurality of (eight, in this example) pixel values are packed in each region 442, as indicated by 444. R, G, and B values each represented by 10 bits are packed in each pixel value included in each region 442, as indicated by 446. The remaining 2 bits are invalid bits in which no data is stored to facilitate access to the DRAM.

The image data 440 has a size of 8M×N pixels. Note that FIG. 4A shows an example in which the minimum unit of the image data 440 is defined as 1 vertical pixel×8 horizontal pixels=32 bytes as in the region 442. However, the minimum unit of the image data 440 is not limited to this example and, for example, the minimum unit may be set to 2 vertical pixels×4 horizontal pixels=32 bytes.

Image Data Input/Output

Image data input/output processing from the RAM 106 to the input/output unit 152 or from the input/output unit 152 to the band memory will be explained with reference to FIG. 2A. The band region 301 (length Bdl×height Bdh) is extracted from image data 300 and stored in the RAM 106 as input image data 210. The input image data 210 has the data structure based on 32 bytes for easy handling in the RAM 106, as described with reference to FIG. 4A.

Referring to FIG. 2A, when the CPU 102 transmits an instruction 221 to the DMAC 194, the DMAC 194 reads out the input image data 210 from the RAM 106 through the shared bus 190 shown in FIG. 1 and inputs it to the image processor 150. The input image data 210 is divided into processing units each having a size of 32-byte width×height Bdh_in, that is, M subregions from region 1 to region M in accordance with the above-described data structure.

The DMAC 194 reads out the image data of the M subregions in the order from subregion 1 to subregion M and inputs them to the image processor 150. The image processor 150 receives the image data of the subregions and executes image processing on a subregion basis. Note that depending on the size of the processing unit of the image processor 150, the image data may be read out and processed for each subregion of the input image data 210, or the whole input image data 210 may be read out and processed at once.

The above-described instruction 221 from the CPU 102 to the DMAC 194 includes, for example, items such as "start address of read destination", "continuous read amount" representing how many times the 32-byte data should continuously be read out, and "increment value" and "number of repetitions" of the address. For example, for the dot-sequential image data 210 shown in FIGS. 4A and 2A, the contents of the items included in the instruction 221 are start address: S5_IMG_STR_ADDR continuous read amount: 1 (32 Bytes)

increment value: data amount of one line=32 Bytes×M number of repetitions: Bdh_in According to the instruction 221, the first row of subregion 1 is read out from the start address S5_IMG_STR_ADDR (for example, the start of the image data 425) as 32-byte data. To acquire the next data, the address is incremented by 32 bytes×M. The data of the first rows of subregions 2 to M are skipped, and the 32-byte data of the second row of subregion 1 is read out. Data corresponding to the number Bdh_in of repetitions, that is, the data of Bdh_in rows of subregion 1 are read out, and the read of whole data of subregion 1 thus ends.

Read of the data of subregions 2 to M is done by sequentially adding 32 bytes to the "start address" and operating the DMAC 194. In this way, image data of a desired subregion is read out from the RAM 106 by DMA transfer.

The input unit 1521 of the input/output unit 152 transfers the image data to the intermediate buffer 1522 while receiving the image data from the DMAC 194. The intermediate buffer 1522 is formed from an arbitration circuit 230 and a buffer 232. The buffer 232 includes an input region 234 that stores input image data, and an output region 236 that stores image data to be output. The CPU 102 sets the start address of the input region 234 and the start address of the output region 236 in advance as an input region start address and an output region start address. Note that the image data input from the input unit 1521 to the intermediate buffer 1522 is first input to the arbitration circuit 230.

The arbitration circuit 230 temporarily stores the received image data in the input region 234. Normally, the buffer 232 is implemented by a static random access memory (SRAM) or the like. For example, if the bit length of the buffer 232 per word is 256 bits (32 bytes), the number of words to be stored in the input region 234 corresponds to the height of the band region, that is, Bdh_in words that is the number of repetitions of DMA transfer.

If the bit length of the buffer 232 per word is 64 bits (8 bytes), 4 words are necessary to receive 32-byte long data. In this case, the number of words to be stored in the input region 234 is four times of the number Bdh_in of repetitions of DMA transfer. In other words, the input region 234 has a memory amount capable of storing image data of a subregion as the unit of one DMA transfer. Note that when DMA transfer or transfer of input image data of one band region is completed, the DMAC 194 may notify the CPU 102 of it using an interrupt signal 222.

After that, the input unit 1521 reads out the temporarily stored image data of the subregion through the arbitration circuit 230 and inputs the value of each pixel to the image processing execution unit 153 as the input pixel value 155. Note that the input unit 1521 and the output unit 1523 may asynchronously operate. For example, subregion 1 of output image data 250 may be generated and output using subregion 1 and part of subregion 2 in the input image data 210. Pointers 1542 and 1544 are provided in the input unit 1521 and the output unit 1523, respectively, and the operations thereof will be described later.

The image processing execution unit 153 performs image processing for an input region formed from one or more pixels. The image processing is performed, for example, as follows. The values of a plurality of pixels are multiplied by a predetermined weight coefficient. The pixel values after the multiplication of the weight coefficient are totaled to obtain an output value corresponding to one pixel. The processing is performed while moving the region in the height direction of the band region. When an output value corresponding to a column is obtained in the height direction, processing is executed for the pixels of the next column. The pixel values after the processing are output to the output unit 1523 of the input/output unit 152 on a pixel basis.

The output unit 1523 stores the output pixel value 156 in the output region 236 of the buffer 232 through the arbitration circuit 230 based on 32 bytes, thereby generating the output image data 250. The output image data 250 still has the dot-sequential data structure shown in FIG. 4A. However, the format of the output image data 250 changes in some cases. When the image processing execution unit 153 executes various kinds of image processing that changes the data size between input and output, the number of pixels may change between the input image data 210 and the output image data 250. In an example of the output image data 250 shown in FIG. 2A, the height of the output band region is Bdh_out, and the width is 8×N, unlike the input image data 210.

Since the height of the band region changes between the input image data 210 and the output image data 250 shown in FIG. 2A, the data amount of the subregion as the processing unit changes. In addition, since the width of the band region changes as well, the number of subregions also changes from M to N. However, the input image data 210 and the output image data 250 have the same data structure, although the height of the band region and the number of subregions are different. Hence, the memory amount of the output region 236 of the buffer 232 can be set based on the same concept as the memory amount of the input region 234.

For example, if the bit length of the buffer 232 per word is 256 bits (32 bytes), the number of words to be stored in the output region 236 is Bdh_out words that equals the height of the output band region. If the bit length of the intermediate buffer 232 per word is 64 bits (8 bytes), the number of words to be stored in the output region 236 is four times of Bdh_out that is the above-described height of the output band region.

When, for example, Bdh_out pixels corresponding to four columns are input, and the image data of subregion 1 is completed in the output region 236, the output unit 1523 stops receiving the output pixel value 156 from the image processing execution unit 153. The output unit 1523 then sequentially reads out the image data from the output region 236 and sends it to the DMAC 196. The DMAC 196 writes the processed image data in the RAM 106 in accordance with an instruction 225 from the CPU 102. The same operation is sequentially executed for subregions 2 to N, and the output image data 250 of the output band region is wholly written back to the RAM 106.

For example, for the dot-sequential image data 250 shown in FIG. 2A, the contents of items included in the instruction 225 are start address: S5'_IMG_STR_ADDR
continuous read amount: 1 (32 Bytes)
increment value: data amount of one line=32 Bytes×N
number of repetitions: Bdh_out According to the instruction 225, the first row of subregion 1 is written at the start address S5'_IMG_STR_ADDR as 32-byte data. To write the next data, the address is incremented by 32 bytes×N. The data of the first rows of subregions 2 to N are skipped, and the 32-byte data of the second row of subregion 1 is written. Data corresponding to the number Bdh_out of repetitions, that is, the data of Bdh_out rows of subregion 1 are written, and the write of whole data of subregion 1 thus ends.

Write of the data of subregions 2 to N is done by sequentially adding 32 bytes to the "start address" and operating the DMAC 196. In this way, image data of a desired subregion is written in the RAM 106 by DMA transfer.

DMA Transfer in Plural Band Processes

The image processing apparatus according to this embodiment performs band processing by the above-described method. When performing a plurality of band processes, the following problem occurs in DMA transfer. The problem of DMA transfer that occurs in a plurality of band processes will be described below using resolution conversion processing as an example.

The image processing apparatus incorporates various kinds of image processing including spatial filter processing, resolution conversion processing, trimming processing, end expansion processing, and IP conversion processing. The image processing apparatus selectively combines the incorporated processes in accordance with an application and implements high image quality by the entire apparatus. The various kinds of image processing are implemented in the image processing execution unit 153 shown in FIG. 1B as the plurality of image processing circuits 1531. When combining the plurality of image processing circuits 1531 to implement complex image processing by the above-described band processing, it is necessary to use caution to the following point.

When performing an operation of referring to a two-dimensional region like spatial filter processing, peripheral pixels corresponding to the filter diameter with respect to a pixel of interest need to be input to image processing circuit

1531. If such image processing of referring to a two-dimensional region is performed a plurality of times, peripheral pixels are input each time, and input of peripheral pixels in a wider range may be needed. Resolution conversion processing is also one of the image processes of referring to a two-dimensional region. In resolution conversion processing, the image size largely changes before and after the processing.

DMA transfer in enlargement processing by resolution conversion will be described here with reference to FIG. 5A. Assume that the image processing execution unit 153 includes the image processing circuit 1531 that performs resolution conversion by referring to a two-dimensional region formed from 5×5 pixels. In the example of FIG. 5A, image data having a height of 11 lines is input to the image processing execution unit 153. The image data of 11 lines includes two top lines and two bottom lines, which are referred to as peripheral pixels in resolution conversion. That is, out of the 11 pixels in the height direction, seven pixels other than two upper pixels and two lower pixels are actually enlarged by resolution conversion. The two upper pixels and the two lower pixels are "reference pixels" to be only referred to.

FIG. 5A shows band regions to convert resolutions in the order of the first band, second band, and third band from the upper side, and a change in the band height in enlargement processing will be explained. Note that in the example of FIG. 5A, the enlargement ratio is set to 1.37.

First, out of the image data of 11 lines, which is the first band, the above-described image data corresponding to 7 lines is multiplied by 1.37 and output as image data of 10 lines. When the image data of 7 lines is multiplied by 1.37, image data corresponding to 9.6 lines is obtained. This is rounded off to an integer, and an output corresponding to 10 lines is obtained. This is because since the output image data is stored in the global buffer, a fraction of a pixel size needs to be handled as an integer, as described above.

Next, image data corresponding to 11 lines is input as the second band. At this time, the image data of the first band and that of the second band overlap in two lines that are reference pixels, as shown in FIG. 5A, such that the image processing result of the first band and that of the second band continue.

As for the second band as well, the image data of 7 lines is multiplied by 1.37 to obtain an output corresponding to 9.6 lines. The sum of the 1.37-times output lines of the first band and those of the second band is 9.6×2=19.2 lines. Since 10 lines are already output for the first band, the output for the second band is rounded from 19.2−10=9.2 to 9 lines. The same enlargement processing is performed for the third band as well. The output for the third band is rounded from 9.6×3−10−9=9.8 to 10 lines again.

As described above, when performing resolution conversion processing in the band processing in which the height of input image data is constant, the height of the output image data changes on a band region basis depending on the magnification ratio.

FIG. 5B shows a change in the band height when reduction processing (0.39 times) is performed by resolution conversion. According to the reduction processing, 7 lines of input image data change to 3 lines or 2 lines in output image data, and the height of the output image data changes on a band region basis, as in the enlargement processing shown in FIG. 5A.

As described above, the output image data after the resolution conversion processing is DMA-transferred on a subregion basis and stored in the global buffer. A set value (start address or number of repetitions) used for the DMA transfer is not uniform between the band regions depending on the magnification ratio of the resolution conversion processing. For example, the start address of DMA transfer cannot be calculated by a simple operation of, for example, adding a fixed value in every transfer.

In this case, it is necessary to calculate the set value of DMA transfer for each band region by firmware. It is also necessary to sequentially set the set value calculated by the firmware to the DMACs 194 and 196 corresponding to the input and output of the image processor 150. After the setting, the DMACs 194 and 196 are activated to operate the image processor 150. Hence, the CPU 102 that executes the firmware needs to periodically calculate the set value for each band region, set the set value, and activate the DMAC. In addition, the CPU 102 needs to wait for an interrupt representing completion of image processing of the image processor 150.

It is not uncommon for the CPU 102 to need a time of several ms to receive such an interrupt representing completion of image processing, check the interrupt factor, and transit to the next operation. As a result, a processing load to some degree is always applied to the CPU 102 for synchronization with the processing of the image processor 150, and the CPU 102 is not released during the image processing.

To solve the problem of DMA transfer, the input/output unit 152 of the image processor 150 includes the pointer 1542 that stores a line pointer used to calculate an address when reading out a band region from input image data stored in the global buffer, and the pointer 1544 that stores a line pointer used to calculate an address when writing a processed band region in the global buffer. The line pointer indicates the position of the top line of a band region in the global buffer. DMA functions to be described below are implemented using the pointers 1542 and 1544.

First DMA Function

As the first DMA function, a function of calculating the "start address" of DMA transfer is implemented using the pointers 1542 and 1544.

The relationship between the pointers 1542 and 1544 and an image data storage area in the global buffer will be described with reference to FIG. 6A. Assume that setting is done in advance such that a storage area corresponding to image data of one page (one screen) is allocated as the global buffer, and the start address stores the image data of the upper left corner of the page. As shown in FIG. 6A, an area BI for storing input image data and an area BO for storing output image data are separately prepared. The areas BI and BO are allocated to the global buffer so as not to overlap each other.

Since image processing is sequentially repeated for each band region, FIG. 6A shows a state in which band regions A to D of input image data are sequentially stored in the area BI, and band regions X to XA of output image data are sequentially stored in the area BO. To temporarily store the line position of the top of each band region, the input unit 1521 shown in FIG. 2A includes the pointer 1542, and the output unit 1523 includes the pointer 1544. Each of the pointers 1542 and 1544 includes a register that holds a line pointer.

To perform DMA transfer, the start address of DMA transfer needs to be calculated. Using the line pointer temporarily stored in the pointer 1542 or 1544, the start address of DMA transfer is calculated by $$SAT = SAdr + Vinc \times Lptr \quad (1)$$

where

SAT is the start address of DMA transfer,
SAdr is the start address of the buffer,
Vinc is the increment value of the address,
Lptr is the value of the line pointer Referring to FIG. 6A, the image data of the first band region A is input. The value Lptr(A) of the line pointer at this time is "0". For this reason, the start address SAT of DMA transfer to input the image data is obtained from equation (1) as a start address SAdr_i of the input buffer shown in FIG. 6A.

The input image data is processed, and the image data of the first band region X is output. The value Lptr(X) of the line pointer at this time is also "0". Hence, the start address SAT of DMA transfer to output the image data is obtained from equation (1) as a start address SAdr_o of the output buffer shown in FIG. 6A.

Next, the image data of the second band region B is input. The value Lptr(B) of the line pointer at this time is "+7" in the example of FIG. 5A. The band height except the reference pixels is always 7 lines in any of enlargement, reduction, and normal size. Hence, the change amount of the value of the line pointer when transiting from the first band region A to the second band region B is "+7" independently of processing. For this reason, the start address SAT of DMA transfer to input the image data is obtained from equation (1) as SAdr_i+Vinc×7.

On the other hand, the line pointer Lptr(Y) of the second band region Y output after image processing is "+10" in the example of enlargement shown in FIG. 5A, "+3" in the example of reduction shown in FIG. 5B, or "+7" in normal-size processing shown in FIG. 5C. This is because the band region output after image processing is written in the global buffer without overlapping. The height of the output band region itself is the change amount of the line pointer when transiting from the first band region X to the second band region Y. For this reason, the start address SAT of DMA transfer to output the second band region Y is obtained from equation (1) as SAdr_o+Vinc×10 in enlargement processing, SAdr_o+Vinc×3 in reduction processing, or SAdr_o+Vinc×7 in normal-size processing.

Furthermore, the image data of the third band region C is input, and the image data of the third band region Z is output. Concerning the input, the operation is the same as that for the second band region Y, and a description thereof will be omitted. As for the output, the line pointer Lptr(Z) of the third band region Z is "+9" in the example of enlargement shown in FIG. 5A, "+2" in the example of reduction shown in FIG. 5B, or "+7" in the example of normal-size processing. As described above, the change amount of the line pointer is not uniform because of the variation in the height of the band region after processing. Details of management of the line pointer will be described later. The start address of DMA transfer at the time of output is automatically calculated from equation (1) in accordance with the line pointer.

Second DMA Function

As the second DMA function, an automatic calculation function of the number of repetitions of DMA transfer in the output unit 1523 is implemented. A method of calculating the "number of repetitions" of DMA transfer as the number of reception lines will be described below with reference to the overall control sequence of the image processing apparatus shown in FIG. 8.

The CPU 102 sets the start address of the input buffer, the continuous read amount, the increment amount, the number of repetitions, and the value "0" of the line pointer as the initial values to the input unit 1521, as described above. The change amount of the line pointer of the input band region can be set in advance because it is always uniform, like the above-described height "+7" of the input band region except the reference pixels.

Similarly, the CPU 102 sets the start address of the output buffer, the continuous read amount, the increment amount, the number of repetitions, and the value "0" of the line pointer as the initial values to the output unit 1523. As for the output band region, however, the number of repetitions and the change amount of the line pointer are not uniform and are therefore automatically set by a method to be described later. For example, as the initial value of the number of repetitions, a value that permits automatic setting is set. After that, the CPU 102 activates the input unit 1521 and the output unit 1523 (S810).

The activated input unit 1521 activates the DMAC 194. The DMAC 194 automatically calculates the start address from the initial setting, reads out the image data of the input band region ("LOAD" in FIG. 8), calculates the number of read lines of the readout image data (S820), and writes the readout image data in the input region 234 of the buffer 232 ("WRITE" in FIG. 8). When the read of the image data of the subregion and the write in the buffer 232 end, the DMAC 194 ends the "LOAD operation" shown in FIG. 8.

When the "LOAD operation" is completed, the input unit 1521 rewrites, based on the number of read lines, the register that holds the number of transmission lines of a transmitting unit 1541 (S830), and activates the transmitting unit 1541. The transmitting unit 1541 reads out the image data of the subregion from the intermediate buffer 1522 ("READ" in FIG. 8) and transmits it to the image processing execution unit 153 as pixel values ("SEND" in FIG. 8). The transmitting operation shown in FIG. 8 thus ends, and the image processing execution unit 153 executes desired image processing for the image data of the subregion (S850).

On the other hand, the activated output unit 1523 immediately activates a reception unit 1543. The reception unit 1543 waits until the image processing execution unit 153 starts outputting processed pixel values. When output of the processed pixel values starts, the reception unit 1543 starts a reception operation ("RECV" in FIG. 8), counts the number of received processed pixel values, and calculates the coordinates of each pixel value. Each processed pixel value has a flag representing vertical position information (for example, top/bottom) in the subregion. The coordinates of each pixel value can be calculated based on the position information. Note that since the coordinates need only decide a pixel position in the subregion, coordinates on the output image or coordinates in the band region are usable.

The reception unit 1543 calculates the number of reception lines for each subregion as well as the coordinates (S860). The received pixel values are written in the output region 236 of the buffer 232 ("WRITE" in FIG. 8). When the image data of the subregion is wholly written, the "reception operation" shown in FIG. 8 ends.

Next, the output unit 1523 rewrites the set value "number of repetitions" of the DMAC 196 by the number of reception lines calculated by the reception unit 1543 (S870). If "automatic setting of the number of repetitions" is permitted by the initial setting, the DMACs 194 and 196 rewrite the number of repetitions to the number of reception lines. If "automatic setting of the number of repetitions" is not permitted, the DMACs 194 and 196 hold the initially set "number of repetitions". That is, control can be performed such that the DMAC 194 holds the "number of repetitions" because the "number of repetitions" of image data transfer is constant, and the DMAC 196 rewrites the "number of repetitions" based on the number of reception lines because the "number of repetitions" of image data transfer is not constant.

After that, the output unit 1523 activates the DMAC 196. When the DMAC 196 reads out the image data from the output region 236 of the buffer 232 ("READ" in FIG. 8), automatically calculates the start address from the initial set value, writes the image data of the output band region in the global buffer ("STORE" in FIG. 8), and wholly writes the image data of the subregion, the "STORE operation" shown in FIG. 8 ends.

As described above, in the output unit 1523, the reception unit 1543 calculates the number of reception lines before execution of DMA transfer, thereby automatically calculating the "number of repetitions" of DMA transfer. Hence, even if the band height of the output band region varies upon resolution conversion, the DMA transfer amount can be calculated following the variation immediately before DMA transfer, and the DMA transfer can be executed.

Using the buffer 232, the input unit 1521 cooperatively performs the "LOAD operation" and the "transmitting operation", and the output unit 1523 cooperatively performs the "reception operation" and the "STORE operation". Since the input unit 1521 activates the DMAC 194, and the output unit 1523 activates the DMAC 196, each of the input unit 1521 and the output unit 1523 can change the set value of DMA transfer in accordance with the operation state of image processing.

Third DMA Function

Figure 7A:
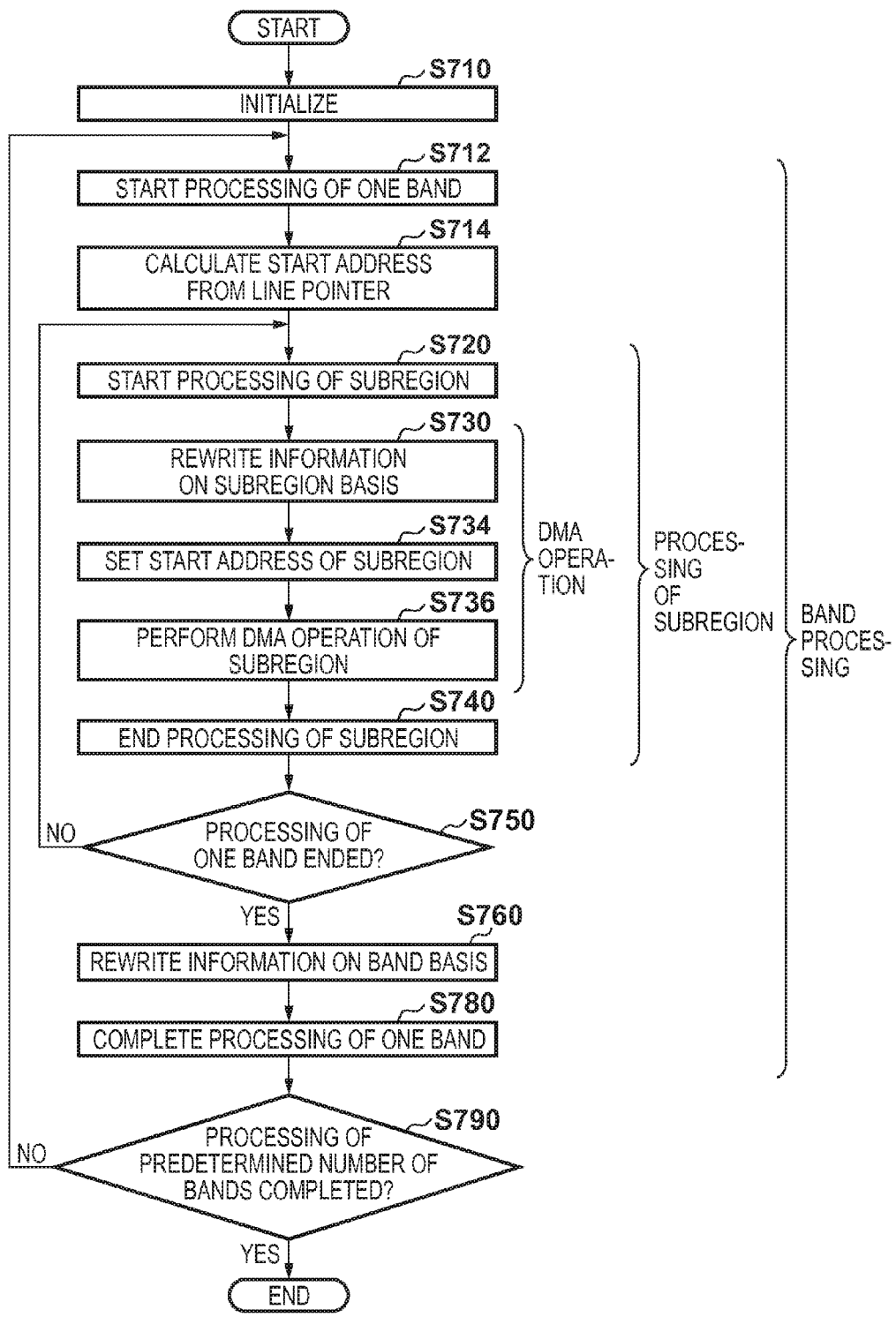

As the third DMA function, a line pointer management function is implemented. Data transfer including management of the line pointers will be described below with reference to FIG. 7A. The processing shown in FIG. 7A is executed by each of the input unit 1521 and the output unit 1523. Processing of the output unit 1523 will mainly be explained here.

After initial setting (S710) as indicated by S810 in FIG. 8, processing of one band starts (S712). The output unit 1523 calculates the start address from the line pointer held by the pointer 1544 based on equation (1) (S714), and starts processing of the subregion (S720). The LOAD operation, transmitting operation, reception operation, and STORE operation for each subregion are the same as described above with reference to FIG. 8. The output unit 1523 rewrites the "number of repetitions" of the DMAC 196, in other words, "information on a subregion basis" (S730) at the timing of DMAC information rewrite (S870) shown in FIG. 8, and sets the "start address" of the corresponding subregion to the DMAC 196 (S734). Since the subregion is scanned in the length direction (sub-scanning direction) of the band, the output unit 1523 first calculates the start address of the band region, and calculates the start address of the subregion from the "continuous read amount" in accordance with the position of the subregion. After that, the DMACs 194 and 196 perform the DMA operation of the subregion (S736), and the processing of the subregion ends (S740).

When the processing of the subregion has ended, it is determined whether processing of one band, in other words, processing of all subregions of one band has ended (S750). If an unprocessed subregion remains, the process returns to step S720 to process the next subregion.

When the processing of one band ends, information on a band basis is rewritten (S760). That is, the line pointer held by the pointer 1542 or 1544 is updated. An initially set change amount (for example, "+7") is added to the value of the line pointer held by the pointer 1542 of the input unit 1521. The number of reception lines used to rewrite the information on a subregion basis (S730) is added to the value of the line pointer held by the pointer 1544 of the output unit 1523. Processing of one band is thus completed (S780).

Next, it is determined whether processing of a predetermined number of bands is completed (S790). If an unprocessed band remains, the process returns to step S712 to process the next band. When processing the next band, since the line pointer has appropriately been updated by the number of reception lines in step S760, band processing can be started from an appropriate start position by calculating the start address (S714).

As described above, the automatic calculation function of the start address of DMA transfer based on the line pointer, the automatic calculation function of the "number of repetitions" of DMA transfer, and the line pointer management function are implemented as the first to third DMA functions. This allows the input unit 1521 to cooperatively perform the "LOAD operation" and the "transmitting operation" using the buffer 232, and allows the output unit 1523 to cooperatively perform the "reception operation" and the "STORE operation using the buffer 232". The cooperation of these operations makes it possible to continuously execute image processing of bands without intervening the CPU 102 in accordance with the situation of image processing.

Conventionally, if the number of pixels changes between input image data and output image data for each band in resolution conversion processing or the like, DMA setting is done by calculation using firmware. According to this embodiment, however, since the DMACs 194 and 196 respectively serving as the input and output of the image processor 150 operate following the processing result, the CPU 102 need not control the setting, activation, and synchronization of the image processor. This makes it possible to decrease the time needed for synchronization between the CPU 102 and the image processor 150 and speed up the entire image processing. In addition, since the CPU 102 need not execute the series of control processes by firmware for each band, the load on the CPU 102 can be reduced. It is therefore possible to efficiently transfer image data to the image processor 150 to speed up the entire image processing and reduce the processing load on the CPU 102.

Modification of Embodiment

The buffer 232 can be expanded to a 2-bank structure. For example, the intermediate buffer 1522 is changed to a 2-bank structure formed from a storage area A and a storage area B, as shown in FIG. 2B. With the 2-bank structure, the intermediate buffer 1522 can simultaneously store the image data of two subregions, and bank change to switch the storage area is performed in accordance with the processing situation.

If the intermediate buffer 1522 has a 1-bank structure, the "LOAD operation" of image data and the "transmitting operation" of pixel value are time-divisionally performed, and the "reception operation" of output pixel values and the "STORE operation" of output image data are time-divisionally performed. When the intermediate buffer 1522 has the 2-bank structure, the "LOAD operation" of the image data of the next subregion can be performed even during the "transmitting operation" of pixel values, and the "STORE operation" of the output image data of the preceding subregion can be performed even during the "reception operation" of output pixel values. It is therefore possible to parallelly execute the processing of the DMAC 194 and that of the transmitting unit 1541 and also parallelly execute the processing of the DMAC 196 and that of the reception unit 1543.

In addition, since the image data before processing and that after processing are simultaneously input/output, each of the input region 234 and the output region 236 of the buffer 232 is divided into the banks (bank A and bank B). Hence, the CPU 102 sets the start address for each of the input region 234 and the output region 236 in advance. To easily perform the processing, one set of start addresses suffices for the banks A and B. The memory amount of each bank is calculated based on the maximum values of the input band height and output band height of the image data before processing and those after processing.

When the buffer 232 is thus assigned to each of a plurality of image data to be handled by the image processor 150 simultaneously, the image processing can be speeded up.

Second Embodiment

A data transfer apparatus and a method thereof in an image processing apparatus according to the second embodiment of the present invention will be described below. Note that the arrangement of the image processing apparatus according to the second embodiment is the same as in the above-described first embodiment, and a description thereof will be omitted. In the first embodiment, an example has been described in which the global buffer allocated to the RAM 106 or the storage device 108 has a memory amount to store input image data and output image data corresponding to one page (one screen). However, it may be impossible to prepare a memory amount corresponding to one page in the global buffer to suppress the cost of the product. In the second embodiment, an example will be described in which if the global buffer is smaller than the memory amount of one page, the global buffer is used as a ring type buffer (to be referred to as a "ring buffer" hereinafter), thereby enabling image processing of one page.

Figure 6B:
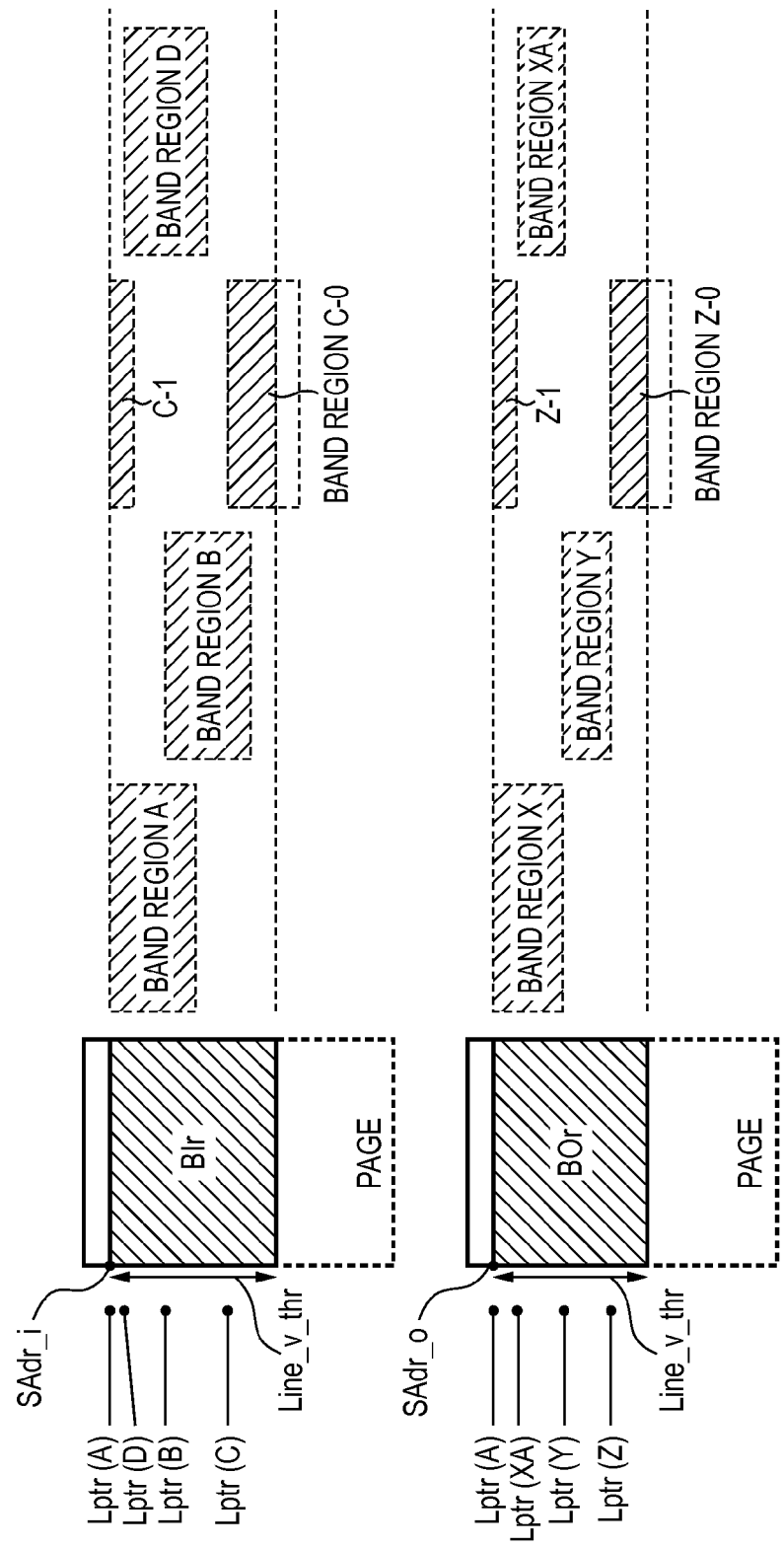

FIG. 6B shows an example of band processing using a ring buffer. When image data under processing reaches the bottom of the buffer, the line position of the buffer for storing such image data is circulated. This control (to be referred to as "circulating control" hereinafter) can suppress the memory amount necessary for processing of one page smaller than the memory amount of one page.

As shown in FIG. 6B, an area BIr to store input image data and an area BOr to store output image data are allocated to the global buffer so as not to overlap each other. Since image processing is sequentially repeated for each band region, FIG. 6B shows a state in which band regions A to D of input image data are sequentially stored in the area BIr, and band regions X to XA of output image data are sequentially stored in the area BOr, like FIG. 6A. To temporarily store the line position of the top of each band region, a pointer 1542 of an input unit 1521 and a pointer 1544 of an output unit 1523 manage line pointers, as in the first embodiment.

Referring to FIG. 6B, the image data reaches the bottom of the buffer during processing of the band region C of the input image data and during processing of the band region Z of the output image data. When the image data of a given band region reaches the bottom of the buffer, following image data is stored from the top of the buffer. Hence, the band region C is divided into C-0 and C-1 and the band region Z is divided into Z-0 and Z-1. Hence, in the second embodiment, a procedure of data transfer processing different from the first embodiment is necessary.

Line Pointer Management Function

Figure 7C:
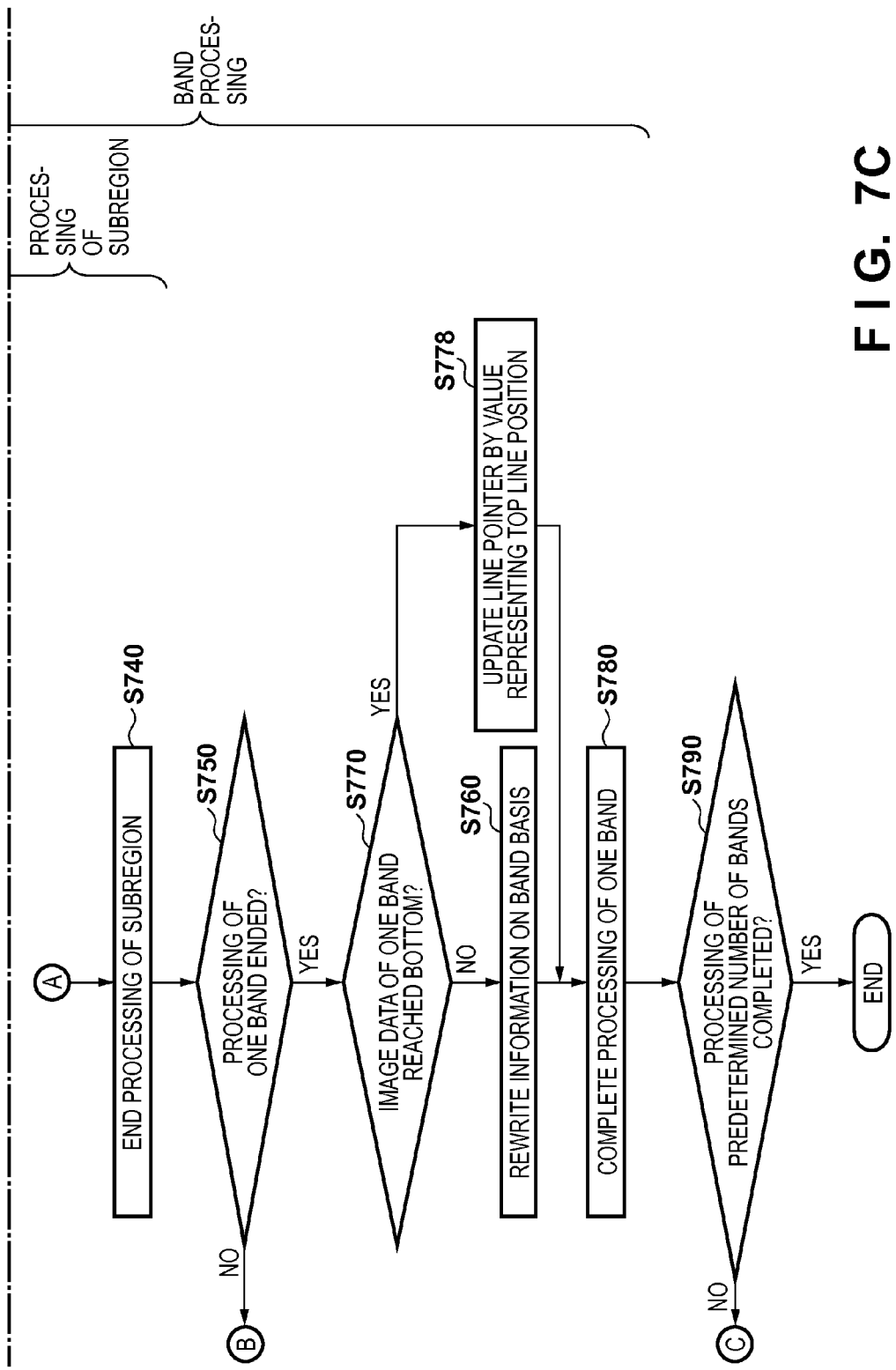

Data transfer including management of line pointers when using a ring buffer will be described below with reference to FIGS. 7B and 7C. Only points changed from the first embodiment by using a ring buffer will be described below. The same step numbers as in the first embodiment denote the same processes, and a description thereof will be omitted. The processing shown in FIGS. 7B and 7C is executed by each of the input unit 1521 and the output unit 1523. Processing of the output unit 1523 will mainly be explained as in the first embodiment.

Referring to FIGS. 7B and 7C, after information on a subregion basis is rewritten (S730), before the start address of the corresponding subregion is set (S734), the output unit 1523 determines whether the line pointer crosses the bottom of the ring buffer (S732). Since the "number of repetitions" of DMA transfer represents the band height of the subregion (number of lines in the sub-scanning direction), whether the line pointer crosses the bottom of the ring buffer can be determined depending on whether a line position obtained by adding the band height to the line pointer is larger than the line position (to be referred to as a "bottom line position" hereinafter) of the bottom of the ring buffer.

If the line position of the addition result is equal to or smaller than the bottom line position, start address setting (S734) and the DMA operation of the subregion (S736) are performed, as in the first embodiment. On the other hand, if the line position of the addition result is larger than the bottom line position, DMA transfer is performed twice.

In the first DMA transfer, the "start address" is set as in the first embodiment, and the value from the line pointer to the bottom line position is set as the "number of repetitions" (S772). DMA transfer is then performed (S773). By the first DMA transfer, the upper portion (band region C-0 or Z-0 shown in FIG. 6B) of the subregion is transferred.

In the second DMA transfer, the "start address" is calculated by setting the line pointer to "0" that represents the line position (to be referred to as an "top line position" hereinafter) of the top of the ring buffer, and a value obtained by subtracting the "number of repetitions" in the first DMA transfer from the band height is set as the "number of repetitions" (S774). DMA transfer is then performed (S775). By the second DMA transfer, the lower portion (band region C-1 or Z-1 shown in FIG. 6B) of the subregion is transferred. As described above, even when the image data of the band region reaches the bottom line position, DMA transfer never breaks.

After that, when the processing of one band ends, before information on a band basis is rewritten (S760, line pointer updating), it is determined whether the line pointer reaches the bottom line position, in other words, whether the image data of one band reaches the bottom line position (S770).

An initially set change amount (for example, "+7") is added to the value of the line pointer held by the pointer 1542 of the input unit 1521. If the line position of the addition result is equal to or smaller than the bottom line position, the line pointer held by the pointer 1542 is updated (S760), as in the first embodiment. On the other hand, if the line position of the addition result is larger than the bottom line position, the line pointer held by the pointer 1542 is updated by the value representing the top line position (S778).

The number of reception lines used to rewrite the information on a subregion basis (S730) is added to the value of the line pointer held by the pointer 1544 of the output unit 1523. If the line position of the addition result is equal to or smaller than the bottom line position, the line pointer held by the pointer 1544 is updated (S760), as in the first embodiment. On the other hand, if the line position of the addition result is larger than the bottom line position, the line pointer held by the pointer 1544 is updated by the value representing the top line position (S778). When the ring buffer is used, the line pointer is appropriately updated in accordance with a predetermined change amount or number of reception lines. Hence, band processing can be started from an appropriate start position by calculating the start address at the start of a band (S714). In other words, the line pointer management function corresponding to the ring buffer is provided, thereby reducing the memory amount of the global buffer for storing input image data and output image data.

Third Embodiment

A data transfer apparatus and a method thereof in an image processing apparatus according to the third embodiment of the present invention will be described below. Note that the arrangement of the image processing apparatus according to the third embodiment is the same as in the above-described first embodiment, and a description thereof will be omitted. In the first and second embodiments, a case where the image data to be processed is dot-sequential image data shown in FIG. 4A has been described. In the third embodiment, an example in which image data of a different format will be described.

Figure 4B:
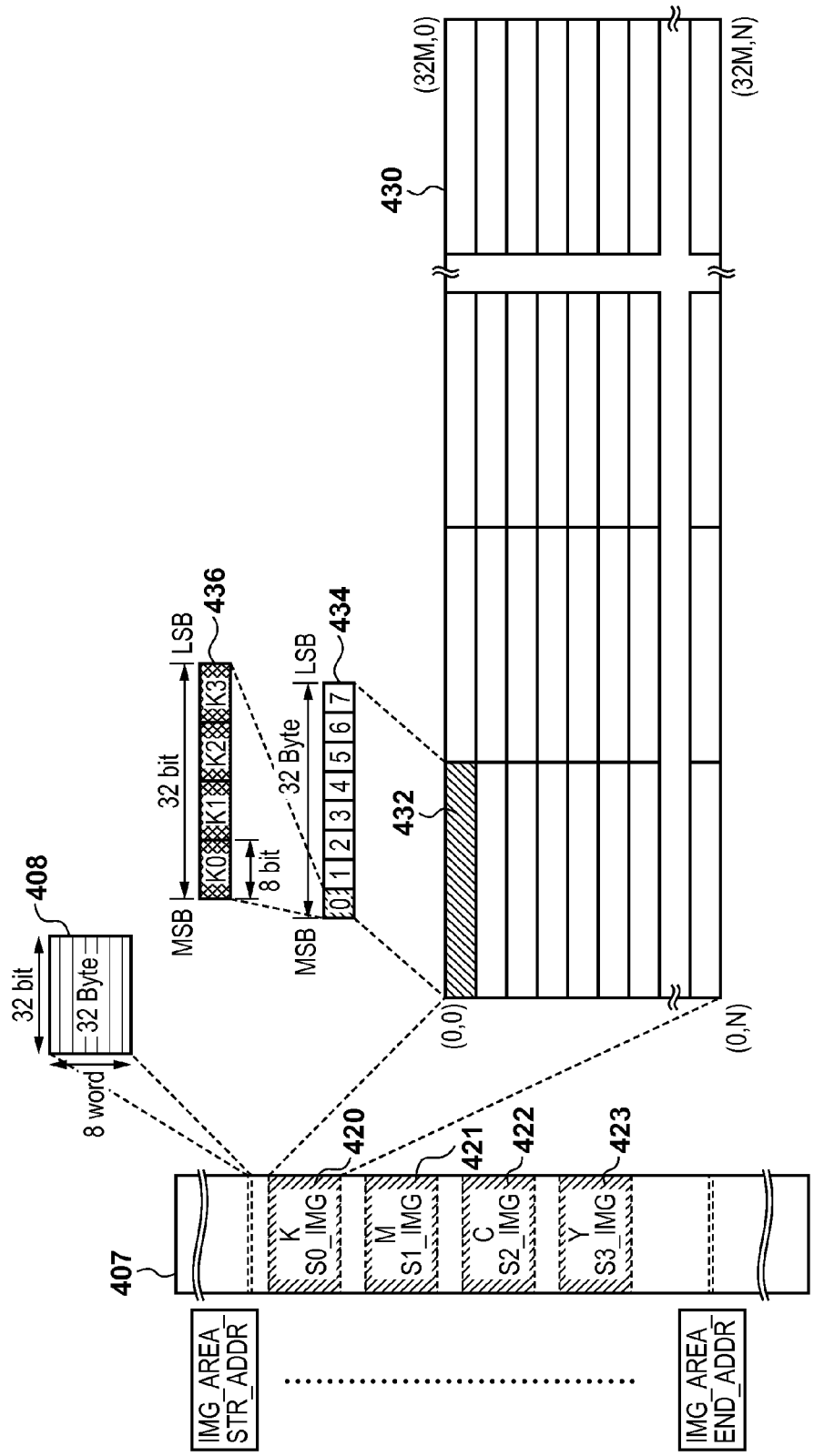

FIG. 4B shows a data structure example and a storage example of image data according to the third embodiment. FIG. 4B shows an example in which plane-sequential image data 420 to 423 are stored in data areas IMG_AREA_STR_ADDR to IMG_AREA_END_ADDR allocated to a RAM 106 formed from a DRAM.

These image data are obtained by performing color space conversion processing or density correction processing for image data read by an image reading unit 120 and color-separating the image data into data K of the first color, data M of the second color, data C of the third color, and data Y of the fourth color. To read/write image data without deteriorating the performance of the DRAM, the minimum unit of image data to be stored is set to 32 bits×8 words=32 bytes, as indicated by 408, as in the first embodiment. In other words, the data amount of the image data 420 to 423 is an integer multiple of 32 bytes.

Image data 430 represents the K image data 420 stored in the DRAM and has a size of 32 M×N bits. Each region 432 of the image data 430 stores 32-bytes data, and a plurality of (eight, in this example) 32-bit long data are packed in each region 432, as indicated by 434. A plurality of (four, in this example) 8-bit long K component data are packed in each 32-bit long data, as indicated by 436. Each of the image data 421 to 423 also has the same data structure.

Image Data Input/Output

Image data input/output processing from the global buffer to an input/output unit 152 or from the input/output unit 152 to the global buffer according to the third embodiment will be explained below with reference to FIG. 2A, as in the first embodiment. When processing plane-sequential image data shown in FIG. 4B, four image data K to Y are read out from the global buffer on a subregion basis. For example, for image data corresponding to M subregions of input image data 210 shown in FIG. 2A, the start addresses of the following four image data are sequentially set as the start address of a DMAC 194, and DMA transfer is executed four times. DMA transfer is thus performed for each of the K to Y colors.

start address of first DMA transfer: S0_IMG_STR_ADDR
start address of second DMA transfer: S1_IMG_STR_ADDR
start address of third DMA transfer: S2_IMG_STR_ADDR
start address of fourth DMA transfer: S3_IMG_STR_ADDR All the four color image data read out in accordance with the four addresses are temporarily stored in a buffer 232. Four data at corresponding positions (coordinates) are read out from the four image data stored in the buffer 232 and input to an image processing execution unit 153 altogether as dot-sequential pixel values C, M, Y, and K. In addition, four data are extracted from the dot-sequential pixel values C, M, Y, and K after processing of the image processing execution unit 153 and stored in the regions of the four output image data in an output region 236. As a matter of course, DMA transfer needs to be performed four times even when writing output image data to the global buffer.

Line Pointer Management Function

In the third embodiment, DMA transfer needs to be performed as many times as the number of planes (four for CMYK) of the plane-sequential image data when inputting/outputting image data to/from the global buffer. Hence, the number of times of DMA operation changes as compared to the processing procedures of the above-described first and second embodiments.

Figure 7D:
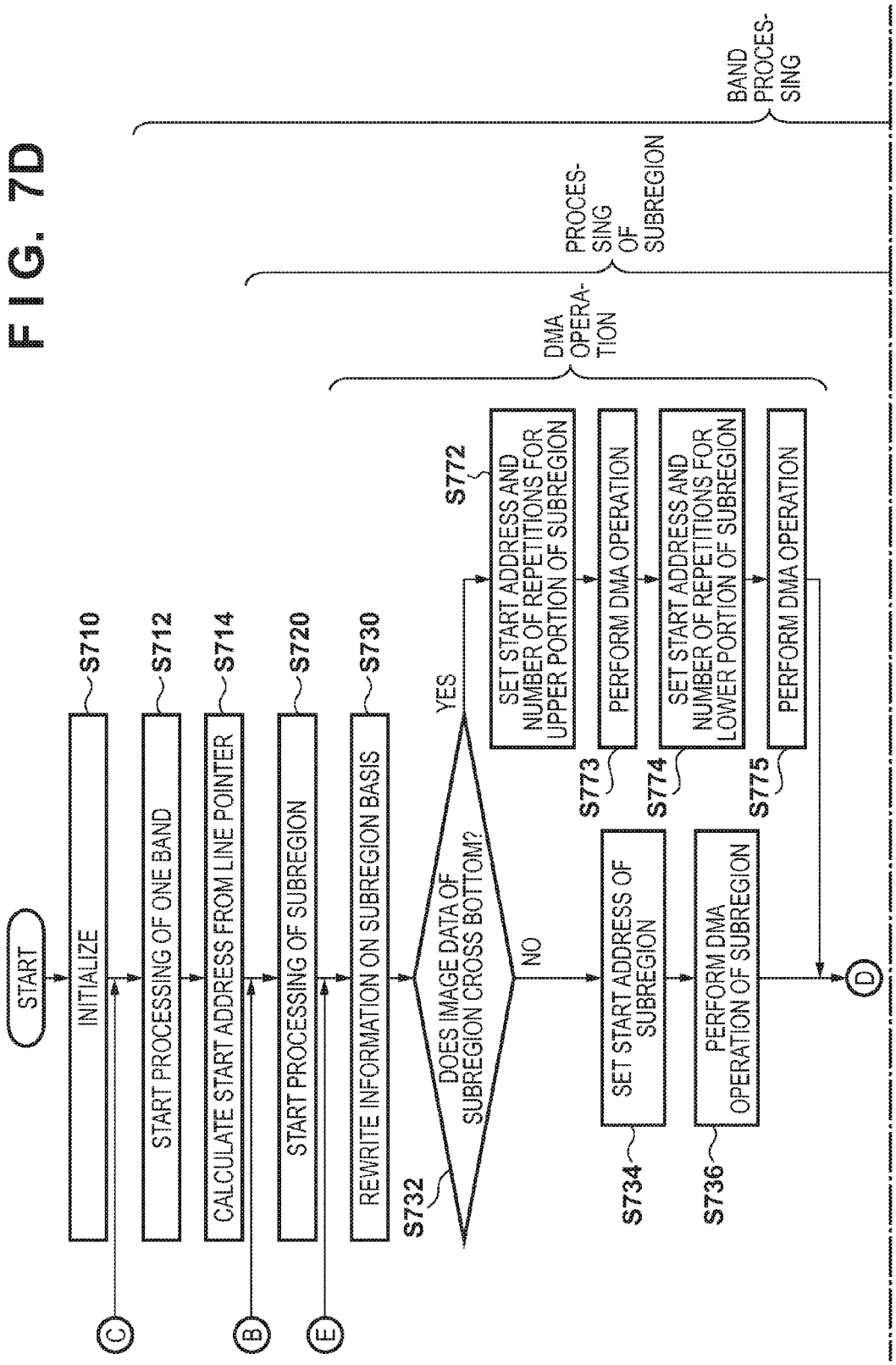
Figure 7E:
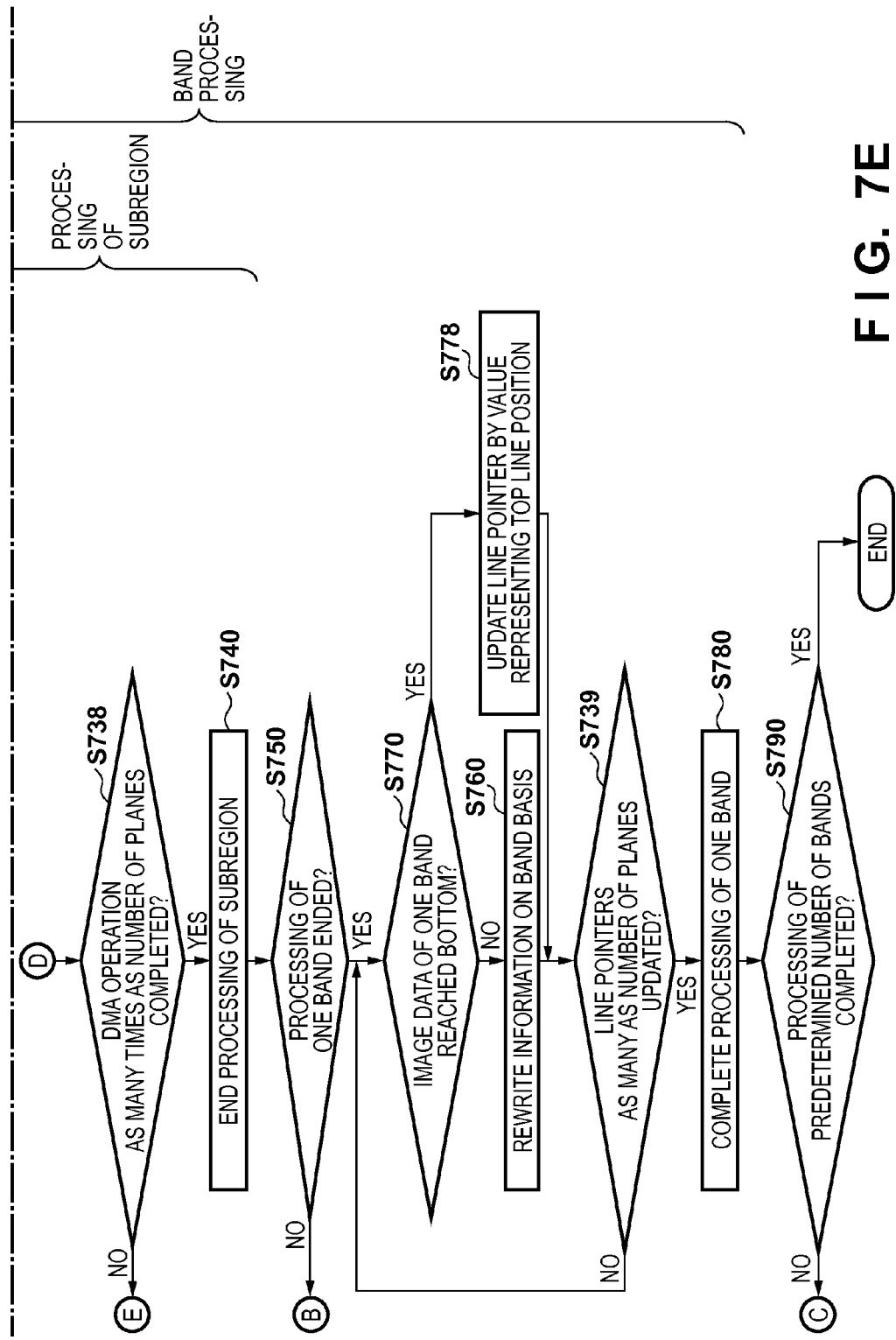

Data transfer including management of line pointers when processing plane-sequential image data will be described below with reference to FIGS. 7D and 7E. In FIG. 7C, processing (S738 and S739) for handling plane-sequential image data, which is unique to the third embodiment, is added to the processing procedure shown in FIGS. 7B and 7C of the second embodiment. Only points changed from FIGS. 7B and 7C will be described below. The same step numbers as in the processes of the first and second embodiments denote the same processes, and a description thereof will be omitted. The processing shown in FIGS. 7D and 7E is executed by each of an input unit 1521 and an output unit 1523. Processing of the output unit 1523 will mainly be explained as in the first embodiment.

Referring to FIGS. 7D and 7E, after the DMA operation of a subregion (S736 or S775), it is determined whether the DMA operation has been executed as many times as the number of planes (number of colors) of plane-sequential image data (S738). FIG. 6B shows an example of four color image data. Hence, if the number of times of DMA operation is smaller than four, the process returns to step S730 to repeat the DMA operation. After the DMA operation is performed four times, the DMA operation is completed.

Note that each of pointers 1542 and 1544 includes line pointers as many as the number of planes. Steps S770 and step S760 or S778 are repeated by determining whether the line pointers as many as the number of planes are updated (S739) at the end of processing of one band.

Note that although FIGS. 7D and 7E shows an example in which processing (S738 and S739) unique to the third embodiment is added to the processing procedure shown in FIGS. 7B and 7C, steps S738 and S739 may be added to FIG. 7A of the first embodiment.

As described above, the line pointer management function corresponding to the number of planes of plane-sequential input image data and output image data is provided, thereby implementing flexible image processing to cope with image data of various formats.

Modification of Embodiments

It is possible to cope with various other image processing by applying the above-described first to third embodiments.

For example, if the number of subregions included in a band changes from M in input to N in output upon resolution conversion processing, reception of the last subregion can be detected by detecting the last pixel during the "reception operation". After the last subregion is detected, the number of subregions is changed at the time of rewrite (S870) of DMAC information (number of repetitions) shown in FIG. 8. This enables to abandon the DMA transfer and complete processing of one band. It is therefore possible to automatically follow the number of subregions to be processed without calculating and initially setting the number of subregions included in the band region after processing.

The number of reception lines is calculated on a subregion basis (S860). Hence, not only a case where the size of a processed image varies on a band region basis as in resolution conversion processing but also a case where the size of the processed image varies on a subregion basis can be coped with by switching the set value of DMA transfer on a subregion basis. This control can be applied to, for example, processing such as image bend correction of correcting distortion along the main scanning direction.

The control is also applicable to IP conversion processing or the like used in video processing. IP conversion is processing in which a progressive image without thinning pixels is composed, using a plurality of frames in the time-axis direction, from interlaced images whose pixels are thinned out in the sub-scanning direction. For example, when composing a progressive image of one frame from two interlaced images, the total number of pixels of the input image equals the number of pixels of the output image. However, high-quality IP conversion processing composes the progressive image of one frame from three to five interfaced images. Hence, the number of pixels of the output image is smaller than the total number of pixels of the input image. In other words, in the IP conversion processing, since the relationship between the total number of pixels of the input image and the number of pixels of the output image changes depending on the operation mode (image quality mode) selected by the user. For this reason, the number of planes of DMA transfer in the input image data is set as the number of frames of the interlaced images, and the number of planes of DMA transfer in the output image data is set to one frame. That is, it is possible to cope with IP conversion processing by combining the first and third embodiments.

A recent image processing apparatus incorporates various kinds of image processing, including spatial filter processing, resolution conversion processing, trimming processing, end expansion processing, and IP conversion processing. The image processing apparatus selectively combines and uses the image processes in accordance with an application to implement desired high image quality by the entire apparatus. When the present invention is applied to this image processing apparatus, DMAC information of output image data can automatically be set following the size of processed image data while setting the change amount of the line pointer of input image data to a predetermined amount. As a result, even when various kinds of image processing are combined and executed, it is possible to set the DMAC information for each divided region, activate the DMAC, and reduce the load on the CPU 102 necessary for synchronization with the DMAC.

A case where band processing is performed as the image data region division method has been exemplified above. The present invention is also applicable to block (tile) processing that is another region division method. In the block processing, image data is divided into two-dimensional tile regions along the main scanning and sub-scanning directions. The subregion in the above embodiments corresponds to the tile region, and the method of sequentially reading out a plurality of subregions is the block processing in itself. In the above embodiments, the line pointer and the information (bottom line position) of the ring buffer are provided along the band height direction. When a column pointer and the information (for example, right end column position) of the ring buffer along the band length direction are provided to two-dimensionally expand the one-dimensional pointer management, the method of the present invention can be expanded from band processing to tile processing.

In the first embodiment, enlargement processing shown in FIG. 5A and reduction processing shown in FIG. 5B, that is, resolution conversion processing has been exemplified as image processing. The present invention is also applicable to a case where the number of output lines is uniform, like normal-size processing shown in FIG. 5C. That is, the method of the present invention is directly applicable to image processing without enlargement processing or reduction processing by resolution conversion.

The image data read/write unit has been described as 32 bytes above. However, this unit can be changed depending on the structure of the global buffer, the type of the storage device (DRAM, flash memory, hard disk drive, or solid state drive) for implementing the global buffer, and the type of image processing to be executed. Even if the read/write unit changes, the present invention is directly applicable because the number of pixels stored in the local buffer (intermediate buffer) for storing image data only changes.

As the data structure of image data of 32 bytes, different image formats may be used in the input unit 1521 and the output unit 1523 and combined. For example, the input unit 1521 and the output unit 1523 can operate in a combination of the dot-sequential format shown in FIG. 4A and the plane-sequential format shown in FIG. 4B.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-107485, filed May 23, 2014, which is hereby incorporated by reference herein in its entirety.

What is claimed is:

1. A data transfer apparatus for transferring data to an image processor configured to perform a predetermined image process, using a buffer assigned to a storage device, the apparatus comprising:
an input circuitry configured to perform a reading process to read data of an area, which is divided from image data, from the buffer storing the image data to be processed by the predetermined image process, and to perform a transmitting process to transmit the read data of the area to the image processor; and
an output circuitry configured to perform a reception process to receive data generated in the predetermined image process from the image processor, to set a parameter for a writing process based on an area size obtained by using position information of a pixel, and to perform the writing process to write data generated from the received data to the buffer, the received data of the area including the position information,
wherein the output circuitry comprises a first transfer circuitry configured to perform data transfer using direct memory access (DMA) between the output circuitry and the buffer, and
wherein the output circuitry, in place of a CPU, is configured to set the parameter.

2. The apparatus according to claim 1, wherein the first transfer circuitry repeats the data transfer in a unit of a predetermined data amount, and a number of repetitions of the data transfer in accordance with the area size of the received data is set as the parameter of the writing process.

3. The apparatus according to claim 2, wherein the output circuitry further comprises a pointer circuitry configured to store a pointer used in a calculation of an address of the buffer to start writing in the writing process.

4. The apparatus according to claim 3, wherein the pointer circuitry updates the pointer based on the area size of the received data.

5. The apparatus according to claim 3, wherein the pointer indicates a line position of a start line in the buffer to write the received data, and, in a case where a line position obtained by adding a line number corresponding to a height of an area indicated by the area size to the line position indicated by the pointer exceeds a bottom line of the buffer, the output circuitry performs the writing processing two times so as to write the data generated from the received data.

6. The apparatus according to claim 5, wherein, in the case where the line position obtained by the addition result exceeds the bottom line, the pointer circuitry updates the pointer indicating a top line of the buffer.

7. The apparatus according to claim 1, wherein the output circuitry further comprises a reception circuitry configured to perform the reception process, and calculate the area size of the received data based on the position information added to the received data, wherein the position information includes coordinates of a pixel position.

8. The apparatus according to claim 1, wherein the area of data read in the reading process corresponds to a band area obtained by dividing the image data in one-dimensional direction and has a predetermined size, and the area size of the received data indicates a height of a band area of the received data.

9. The apparatus according to claim 1, wherein the input circuitry comprises:
a second transfer circuitry configured to perform data transfer using the direct memory access (DMA) between the buffer and the input circuitry, and repeat the data transfer in a unit of a predetermined data amount; and
a pointer circuitry configured to store a pointer used in a calculation of an address of the buffer to start reading in the reading process.

10. The apparatus according to claim 9, wherein the pointer circuitry updates the pointer based on a size of the area of the read data.

11. The apparatus according to claim 9, wherein the pointer indicates a line position of a start line of the area in the buffer, and, in a case where a line position obtained by adding a line number indicating a height of the area to the line position indicated by the pointer exceeds a bottom line of the buffer, the input circuitry performs the reading process two times so as to read data of the area.

12. The apparatus according to claim 1, wherein the area of data read in the reading process corresponds to a tile area obtained by dividing the image data in two-dimensional directions and has a predetermined size, and the area size of the received data indicates a height and width of a tile area of the received data.

13. The apparatus according to claim 1, wherein the image data comprises plane sequential data, and the input circuitry repeats the reading process and the output circuitry repeats the writing process in accordance with a number of planes of the plane sequential data.

14. The apparatus according to claim 1, further comprising a local buffer configured to temporally store data transferred between the buffer and the image processor,
wherein the local buffer comprises a region storing data read by the reading process, and another region storing data to be written by the writing process.

15. The apparatus according to claim 14, wherein the local buffer comprises a plurality of banks, and
wherein the input circuitry performs the reading process and the transmitting process in parallel using the plurality of banks, and the output circuitry performs the reception process and the writing process in parallel using the plurality of banks.

16. The apparatus according to claim 1, wherein the predetermined image process comprises image processing to generate data having an area size different from an area size of the data received by the image processor.

17. The apparatus according to claim 1, wherein the predetermined image process comprises at least one of resolution conversion processing, bend correction processing, or interlace to progressive conversion processing.

18. The apparatus according to claim 1, wherein the image processor is configured to perform a magnification process for the read data of the area, and wherein the output circuitry, in place of the CPU, is configured to set a parameter for writing the read data of the area resulting from the magnification process to the buffer.

19. The apparatus according to claim 1, wherein the buffer includes a DRAM.

20. The apparatus according to claim 1, wherein the position information represents top position in the received data of the area, in a predetermined direction.

21. The apparatus according to claim 1, wherein the position information represents bottom position in the received data of the area, in a predetermined direction.

22. The apparatus according to claim 1, wherein the CPU is configured to activate the first transfer circuitry.

23. A data transferring method for transferring data to an image processor configured to perform a predetermined image process, using a buffer assigned to a storage device, the method comprising steps of:

performing a reading process to read data of an area, which is divided from image data, from the buffer storing the image data to be processed by the predetermined image process;

performing a transmitting process to transmit the read data of the area to the image processor;

performing a reception process to receive data generated in the predetermined image process from the image processor;

setting a parameter for a writing process based on an area size obtained by using position information of a pixel, the received data of the area including the position information; and performing the writing process to write data generated from the received data to the buffer by data transfer using direct memory access (DMA), and wherein an output circuitry of a data transfer apparatus, in place of a CPU, is configured to set the parameter.

24. A non-transitory computer readable medium storing a computer-executable program for causing a computer to perform a data transferring method for transferring data to an image processor configured to perform a predetermined image process, using a buffer assigned to a storage device, the method comprising steps of:

performing a reading process to read data of an area, which is divided from image data, from the buffer storing the image data to be processed by the predetermined image process;

performing a transmitting process to transmit the read data of the area to the image processor;

performing a reception process to receive data generated in the predetermined image process from the image processor;

setting a parameter for a writing process based on an area size obtained by using position information of a pixel, the received data of the area including the position information; and performing the writing process to write data generated from the received data to the buffer by data transfer using direct memory access (DMA), and wherein an output circuitry of the computer, in place of a CPU, is configured to set the parameter.

* * * * *